(12) United States Patent
Sato

(10) Patent No.: US 6,195,930 B1
(45) Date of Patent: Mar. 6, 2001

(54) FISHING LURE

(76) Inventor: Motohiko Sato, 1-16-1, Tokiwa-cho, Tushima-shi, Aichi-ken (JP)

( * ) Notice: Subject to any disclaimer, the term of this patent is extended or adjusted under 35 U.S.C. 154(b) by 0 days.

(21) Appl. No.: 09/152,327

(22) Filed: Sep. 14, 1998

(30) Foreign Application Priority Data

Sep. 16, 1997 (JP) .................................................. 9-270573

(51) Int. Cl.⁷ ................................................ A01K 85/00
(52) U.S. Cl. ............................................ 43/42.3; 43/42.28
(58) Field of Search ............................... 43/42.02, 42.03, 43/42.11, 42.13, 42.15, 42.26, 42.28, 42.29, 42.3

(56) References Cited

U.S. PATENT DOCUMENTS

| | | | |
|---|---|---|---|
| 825,140 | * | 7/1906 | Lull ........................................ 43/42.3 |
| 1,849,434 | * | 3/1932 | Page ....................................... 43/42.02 |
| 2,209,161 | * | 7/1940 | Gunderson ........................... 43/42.02 |
| 2,217,677 | * | 10/1940 | George .................................. 43/42.02 |
| 2,491,846 | * | 12/1949 | Boekenoogen et al. .............. 43/42.3 |
| 2,544,178 | * | 3/1951 | Pfahler .................................. 43/42.3 |
| 2,605,572 | * | 8/1952 | Holmgren .............................. 43/42.3 |
| 2,607,151 | * | 8/1952 | Morris et al. .......................... 43/42.3 |
| 2,867,933 | * | 1/1959 | Stookey ................................. 43/42.02 |
| 3,376,663 | * | 4/1968 | Amrine ................................. 43/42.02 |
| 4,674,223 | * | 6/1987 | Pearce .................................... 43/42.3 |
| 5,088,227 | * | 2/1992 | Toner et al. ............................ 43/42.3 |

FOREIGN PATENT DOCUMENTS

| | | | |
|---|---|---|---|
| 942497 | * | 2/1974 | (CA) ..................................... 43/42.3 |
| 2327727 | * | 6/1977 | (FR) ...................................... 43/42.3 |
| 11-75622 | * | 3/1999 | (JP) . |

* cited by examiner

*Primary Examiner*—Darren W. Ark
(74) *Attorney, Agent, or Firm*—Arent Fox Kinter Plotkin & Kahn, PLLC

(57) ABSTRACT

A lure having a body molded from a material having a lower specific gravity than water, and legs formed to extend to right and left sides of the body at a middle or rear portion of the body, and the legs have an elastic portion extending outwardly from the body as a center to right and left opposing ends of the elastic portion and a pair of water receiving portions secured to the right and left ends of the elastic portion, respectively, having openings toward the lure proceeding direction. The elastic portion repeats bending and bending back motions by elastic force and water resistance exerted to the water receiving portions, as the lure is manipulated to proceed, thereby rendering the lure move with imitated motions as of a small creature as a bait for fish.

3 Claims, 21 Drawing Sheets

FISHING LURE

BACKGROUND OF THE INVENTION

1. Field of the Invention

This invention relates to a lure used as an artificial bait, among fishing tackles.

2. Description of Related Art

Lures are widely used as conventional fishing devices to have good game results. As well known, lures are molded from rubber, plastic, metal, or combinations of those materials and generally constituted of a fish-like, worm-like, or insect-like body, and a hook-shaped fishing hook secured to the body. Such a lure is connected to a fishing line attached to a rod and cast in the water or at the water surface of rivers, lakes, and seas in which fish are conceivably hiding. Where the lure is moved in the water of at the water surface by manipulating the rod with or without a reel by hands, fish mistakenly bites the lure as a bait in response to sounds, vibrations, light generated from the lure. Since the hook attached to the lure sticks the inside of fish mouth when the fish bites, the fish can be lifted upon winding up the fishing line. As lures, lures having various shapes and sizes, such as, so called warms sunk in the water with an earthworm-like configuration to appeal appetite of fish, and top water plugs used as traveled on or at the water surface in utilizing fish habits that fish makes reactions to sounds, vibrations, and light, and so on, have been proposed and used corresponding to targeted fish natures. The top water plugs have various types, and any of these attract fish underwater by making bubbles or sounds on the water surface or manipulating it to move as small creatures such as worms or frogs.

However, such conventional lures require a skilled technique to make effective motions as to attract fish underwater, and it is tough work particularly for beginners who have started game fishing recently. The conventional lures, though similar to worms or minnows in terms of colors and shapes, likely operate to move in a manner different from natural worms or minnows even where manipulated using a highly skilled technique. If fishing games are repeatedly played at the same place, the lures become less attractive to the fish in that area due to learning ability of the fish, thereby making game results poorer.

SUMMARY OF THE INVENTION

This invention is proposed to solve the above problems that conventional lures had. It is an object of the invention to provide a very effective lure offering motions very close to those of small creatures and effective easily even for beginners who have started game fishing recently without demonstrating a high level technique to land more poundage of fish.

The foregoing object is accomplished by providing a lure including: a body molded from a material having a lower specific gravity than water; and a pair of legs formed to extend on right and left sides of the body at a middle or rear portion of the body, the pair having an elastic portion extending outwardly from the body as a center to right and left opposing ends of the elastic portion and a pair of water receiving portions secured to the right and left ends of the elastic portion, respectively, each having a water receiving face extending perpendicular to a lure proceeding direction.

According to this lure, where connected to a fishing line attached to a rod and cast at the water surface of rivers, lakes, and seas in which fish are conceivably hiding, the lure is moved at the water surface by manipulating the rod with or without a reel by hands. When the body moves in the proceeding direction by manipulation of the rod, water resistance entered in the pair of the water receiving portions makes the pair of the water receiving portions located inline with the body. When the body ceases to proceed, the pair of the water receiving portions comes back to the original position by elastic force of the elastic portion. Since the lure, by repeating such manipulations of the rod, moves at the water surface in repeating bending and bending back of the elastic portion, the lure performs imitiated motions very close to those of small creatures such as frogs as baits for fish, thereby stimulating fish as well as their appetite, and thereby remarkably increasing an amount of fish catches in comparison with use of conventional lures.

According to preferred embodiment, each of the water receiving portions may have contact portions to which water entered in the water receiving portions contact when the body is manipulated to move in the lure proceeding direction. The contact portion makes larger the water resistance entered in the water receiving portion, and therefore, the lure performs in a manner much closer to those of small creatures than that without such a contact portion. The elastic portion may be unitedly formed of a rectangular rubber plate whose front surface is attached to orient the lure proceeding direction. Such an elastic portion unitedly formed of a rectangular rubber plate makes itself inexpensive and assembling easier, such as easier attachments of the water receiving portions or the like. The body may have one or more grooves extending parallel to the lure proceeding direction. Such a groove or grooves allow water to flow through the groove or grooves, thereby stabilizing the position of the lure without swinging when the body proceeds at the water surface.

In another aspect of the invention, a lure includes: a body molded from a material having a lower specific gravity than water; a pair of leg supports formed on right and left sides of the body; and a pair of legs pivotally supported to the leg supports, respectively, each leg having an elastic portion extending rightward, leftward, or downward from the body, a water receiving portion secured to an end of the elastic portion, having a water receiving face extending perpendicular to a lure proceeding direction, and a wing plate secured to the water receiving portion. With this lure, the legs pivotally move to render the wing plates secured to the water receiving portions hit the water surface and thereby generate sounds and vibrations, by elastic force of the elastic body constituting the leg members and water resistance entered in the water receiving portions.

In yet another aspect of the invention, a lure includes: a body molded from a material having a lower specific gravity than water; a pair of front end legs formed on right and left sides of the body at a front end of the body; the pair having an elastic portion extending outwardly from the body as a center to right and left opposing ends of the elastic portion, and first and second water receiving portions secured to the right and left ends of the elastic portion, respectively, each water receiving portion having a water receiving face extending perpendicular to a lure proceeding direction; and a rear end legs formed at a rear end of the body, having an elastic portion extending rearward from the body, and a third water receiving portion secured to the elastic portion formed with an opening directing upward. With this lure, when the lure that has reached, e.g., at the bottom of a lake, is manipulated to move in a proceeding direction, after resistance entered in the first to third water receiving portions makes the elastic member bend downward, and when the lure ceases to move, the elastic member come back upwardly. Since the lure, by repeating such manipulations of the lure, moves in the water in repeating bending and bending back of the elastic portion, the lure performs imitated motions very close to those of small creatures as baits for fish, thereby stimulating underwater fish as well as their appetite.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF PREFERRED EMBODIMENTS

Figure 2:
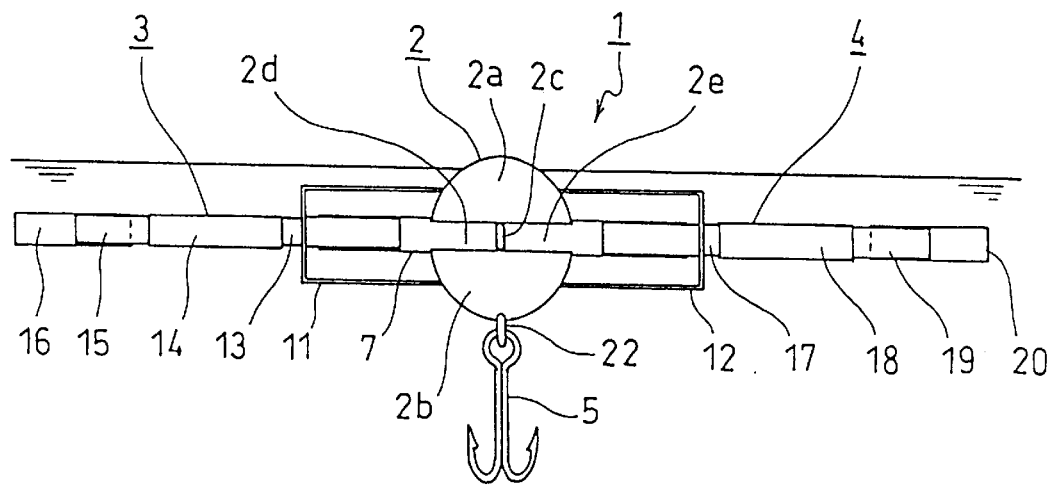
FIG. 2 is a front view showing the lure according to the first embodiment.
Figure 3:
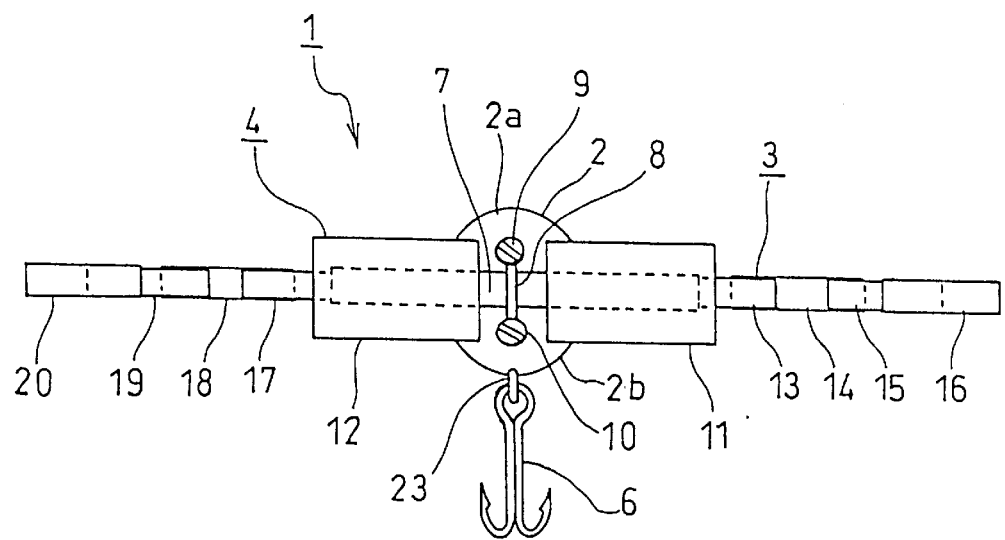
FIG. 3 is a rear view showing the lure according to the first embodiment.

Referring to drawings, lures according preferred embodiments of the invention will be described below. First, a lure according to a first embodiment is described. This lure 1 has symmetric right and left shapes as shown in FIG. 2. The lure 1 is constituted of a body 2 in substantially a spindle shape, a first leg 3, a second leg 4, a first hook 5, and a second hook 6. The body 2, in this embodiment, is constituted of an upper half body 2a and a lower half body 2b molded in substantially a half-moon shape, and a connecting member 2c formed at the center between the upper half body 2a and the lower half body 2b. A pair, or one and the other, of grooves 2d, 2e are formed on right and left sides of the connecting member 2c from the lower surface of the upper half body 2a and the upper surface of the lower half body 2b. A lead weight is attached on the bottom surface of the body to adjust the floating force of the lure so that the water surface is located, as shown in FIG. 2, slightly below the top of the body 2 and so that the first and second legs 3, 4 described below are located slightly below the water surface. An elastic portion 7 made of a rectangular rubber plate, constituting the first and second legs 3, 4 is fixed at a center of the elastic portion to a rear end of the body 2 by a metal fitting 7 whose opposing ends are fixed by screws 9, 10, as shown in FIG. 3. One water receiving portion 11 having a water receiving face extending perpendicular to a lure proceeding direction is secured to one end of the elastic portion 7 as shown in FIG. 2, and the other water receiving portion 12 having a water receiving face extending perpendicular to a lure proceeding direction is secured to the other end of the elastic portion 7. The water receiving portions 11, 12 have a conduit-like shape whose concave surface faces toward the lure proceeding direction where a lure proceeding direction side of the round surface of a resin molded cylinder is cut away from one end to the other end. One contact portion 11a to which water entered in the one water receiving portion 11 contacts when the body 2 is manipulated toward the proceeding direction is formed at the distal end of the one water receiving portion 11, and the other contact portion 12a to which water entered in the other water receiving portion 12 contacts when the body 2 is manipulated toward the proceeding direction is formed at the distal end of the other water receiving portion 12. The one and the other contact portions 11a, 12a have a circle shape and extend perpendicular to the axial directions of the one and the other water receiving portions 11, 12, respectively. A through hole, not shown, is formed in a proximal end of each of the one and the other contact portions 11a, 12a. A cloth connecting portion 13 is attached to one end of the elastic portion 7 as shown in FIG. 2 and passes through the through hole not shown but formed in the one contact portion 11a, and a wooden strip 14 is flexibly attached to a distal end of the connecting portion 13, whereas another wooden strip 16 is flexibly attached to a distal end of the wooden strip 14 by way of a cloth connecting portion 15. A cloth connecting portion 17 is attached to the other end of the elastic portion 7 as shown in FIG. 2 and passes through the through hole not shown but formed in the other contact portion 12a, and a wooden strip 18 is flexibly attached to a distal end of the connecting portion 17, whereas another wooden strip 20 is flexibly attached to a distal end of the wooden strip 18 by way of a cloth connecting portion 19. A first anchor 21 whose tip is in a ring shape is secured to a front end of the body 2 to connect a fishing line, and the first hook 5 is attached to a middle portion of the bottom of the body 2 by a second anchor 22 whose tip is in a ring shape, as well as the second hook 6 is attached by a third anchor 23 whose tip is in a ring shape.

Figure 1:
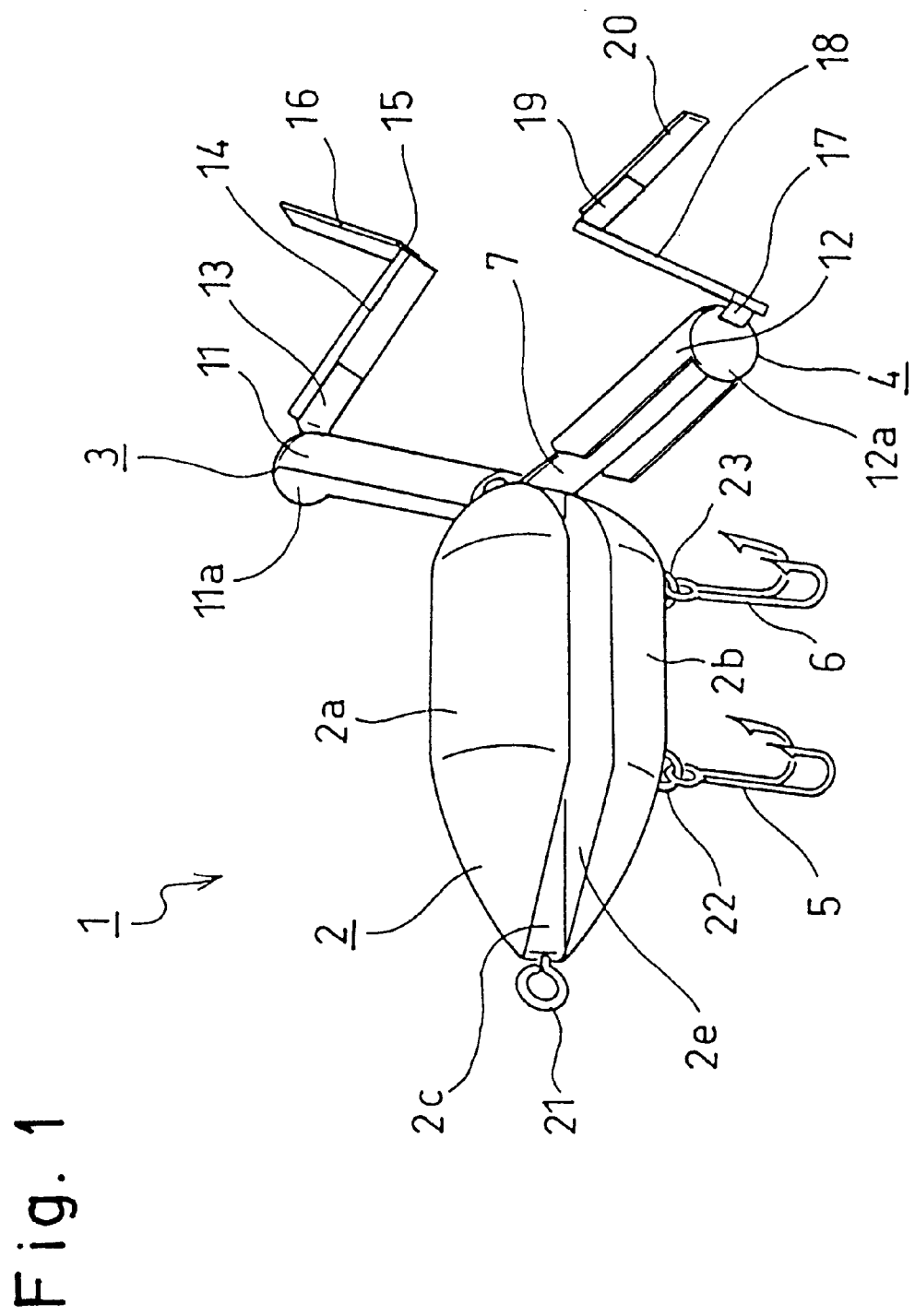
FIG. 1 is a perspective view showing a lure according to a first embodiment of the invention.
Figure 4:
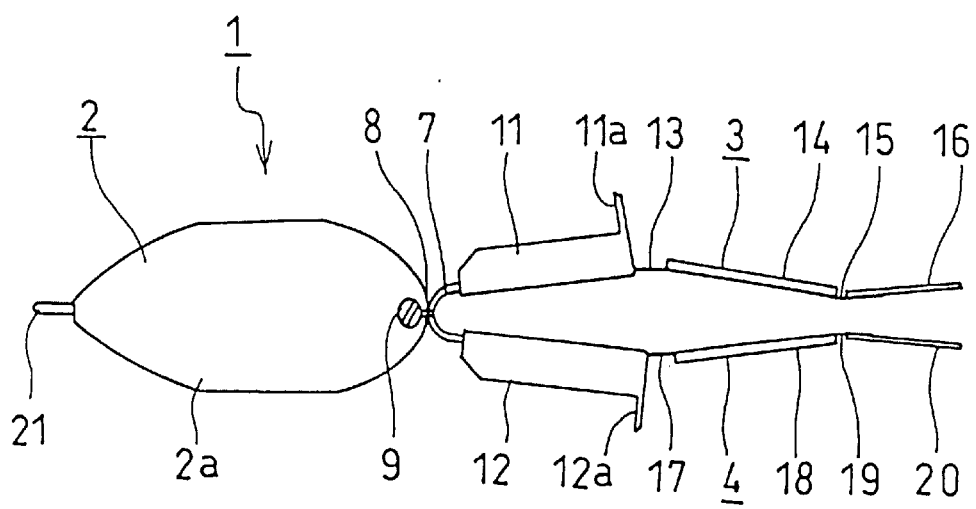
FIG. 4 is a plan view showing motions of legs of the lure according to the first embodiment.

Hereinafter, a using method of this lure 1 is briefly described. First, a fishing line, not shown, attached to a rod, not shown, is connected to the first anchor 21 disposed to the front end of the lure 1, and then, the lure 1 is cast to the water surface of a river, lake, or sea, not shown, in which fish might be hiding. The lure 1 is made move at the water surface by manipulating the rod with or without a reel, not shown, by anglers hands. Where the rod is not manipulated, the lure 1 is as shown in FIG. 2 in a state that a portion of the body 2 above the one and the other grooves 2d, 2e is exposed on the water surface and that the remainder is below the water surface. At that time, the one and other legs 3, 4 are located underwater, and since no external force is exerted to the elastic portion 7, the legs 3, 4 extend perpendicularly to the proceeding direction of the lure 1 and extend straight. If the rod is pulled from this situation, the body 2 is moved forward, and the elastic portion 7 is bent from the metal fitting 8 as a start point as shown in FIG. 4 by resistance of water entered in the one and the other water receiving portions 11, 12. The water entered in the one and the other water receiving portions 11, 12 makes contact with the one and the other contact portions 11a, 12a formed at the distal ends of the one and the other water receiving portions 11, 12, respectively, so that the water resistance entered in the one and the other water receiving portions 11, 12 is maintained. The elastic portion 7, therefore, as shown in FIG. 4, is bent in a U-shape at the center, and at the same time, the lure 1 extends straight from the one water receiving portion 11 to the wooden strips 14, 16 and from the other water receiving portion 12 to the wooden strips 18, 20. That is, the leg 3 extends parallel to the leg 4. If the angler stops pulling manipulation of the rod, the body 2 is stopped to proceed by the water resistance. Then, the one and the other legs 3, 4 bend back to the original positions as shown in FIG. 1 by the elastic force of the elastic portion 7. The wooden strips 14, 18 are pulled to come closer to the one and the other water receiving portions 11, 12, respectively, and the wooden strips 16, 20 are pulled to come closer to the wooden strips 14, 18. By repeating such manipulations of the rods, the lure 1 imitates motions very similar to those of a frog swimming on the water surface, thereby stimulating fish underwater and their appetites. If a fish, not shown, bites the lure 1, the first or second hook 5, 6 attached to the bottom of the body 2 may stick the inside of the fish mouth to allow the angler to catch the fish by pulling up the fishing line.

Figure 5:
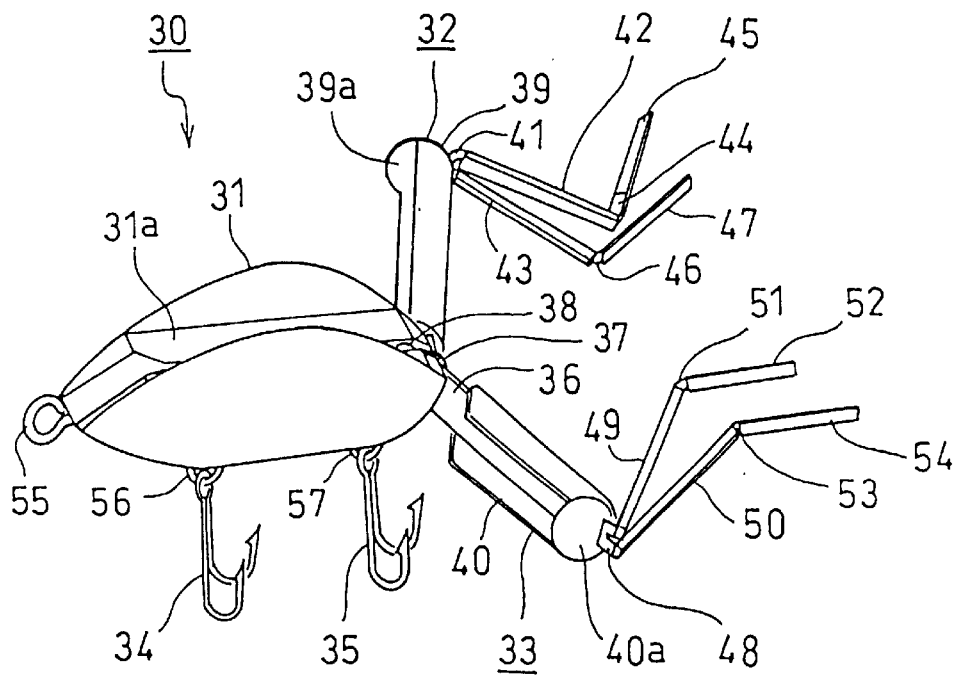
FIG. 5 is a perspective view showing a lure according to a second embodiment of the invention.
Figure 6:
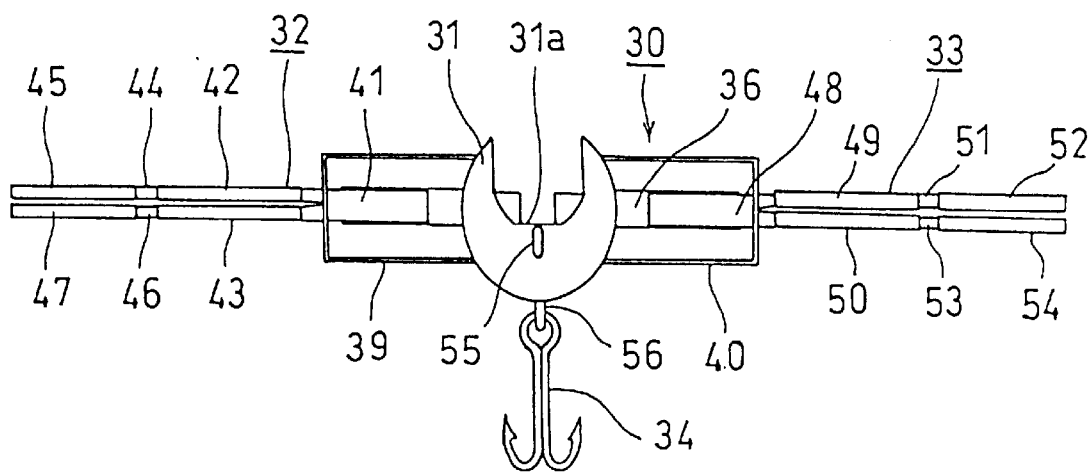
FIG. 6 is a front view showing the lure according to the second embodiment.

A lure 30 according to a second embodiment is described next. This lure 30 has symmetric right and left shapes as shown in FIG. 6. The lure 30 is constituted of a wooden body 31 in substantially a spindle shape, a first leg 32, a second leg 33, a first hook 34, and a second hook 35. A groove 31a is formed on a upper side of the body 31 to communicate the water when the lure 30 proceeds. The groove 31a extends in the proceeding direction of the lure 30 and has a cross section with a cutaway in a reverse T-shape. A lead weight, not shown, is attached at the bottom of the body 31 to adjust floating force when the lure 30 is cast to a water surface. An elastic portion 36 made of a rectangular rubber plate, constituting the first and second legs 32, 33 is fixed at a center of the elastic portion 36 to a rear end of the body 31 by a metal fitting 37 whose opposing ends are fixed by one screw 38 as shown in FIG. 5 and the other screw not shown. One water receiving portion 39 having a water receiving face extending perpendicular to a lure proceeding direction is secured to one end of the elastic portion 36 as shown in FIG. 5, and the other water receiving portion 40 having a water receiving face extending perpendicular to a lure proceeding direction is secured to the other end of the elastic portion 36. These water receiving portions 39, 40 have a conduit-like shape whose concave surface faces toward the proceeding direction of the lure 30 where a lure proceeding direction side of the round surface of a resin molded cylinder is cut away from one end to the other end. One contact portion 39a to which water entered in the one water receiving portion 39 contacts when the body 31 is manipulated toward the proceeding direction is formed at the distal end of the one water receiving portion 39, and the other contact portion 40a to which water entered in the other water receiving portion 40 contacts when the body 31 is manipulated toward the proceeding direction is formed at the distal end of the other water receiving portion 40. The one and the other contact portions 39a, 40a have a circle shape, extend perpendicular to the axial directions of the one and the other water receiving portions 39, 40, respectively, and are in contact with water entered in the one and the other water receiving portions 39, 40 to maintain water resistance. A cloth connecting portion 41 is attached to one end of the elastic portion 36 as shown in FIG. 6 and passes through the through hole not shown but formed in the contact portion 39a, and wooden strips 42, 43 are flexibly attached to a distal end thereof. A wooden strip 45 is flexibly connected to the wooden strip 42 through a cloth connecting portion 44, and a wooden strip 47 is flexibly attached to the wooden strip 43 through a cloth connecting portion 46. A cloth connecting portion 48 is attached to the other end of the elastic portion 36 as shown in FIG. 6 and passes through the through hole not shown but formed in the contact portion 40a, and stick type wooden strips 49, 50 are flexibly attached to a distal end thereof. A stick type wooden strip 52 is flexibly connected to the wooden strip 49 through a cloth connecting portion 51, and a stick type wooden strip 54 is flexibly attached to the wooden strip 50 through a cloth connecting portion 53. A first anchor 55 whose tip is in a ring shape is secured to a front end of the body 31 to connect a fishing line, and the first hook 34 is attached to a middle portion of the bottom of the body 31 by a second anchor 56 whose tip is in a ring shape, as well as the second hook 35 is attached by a third anchor 57 whose tip is in a ring shape.

Figure 7:
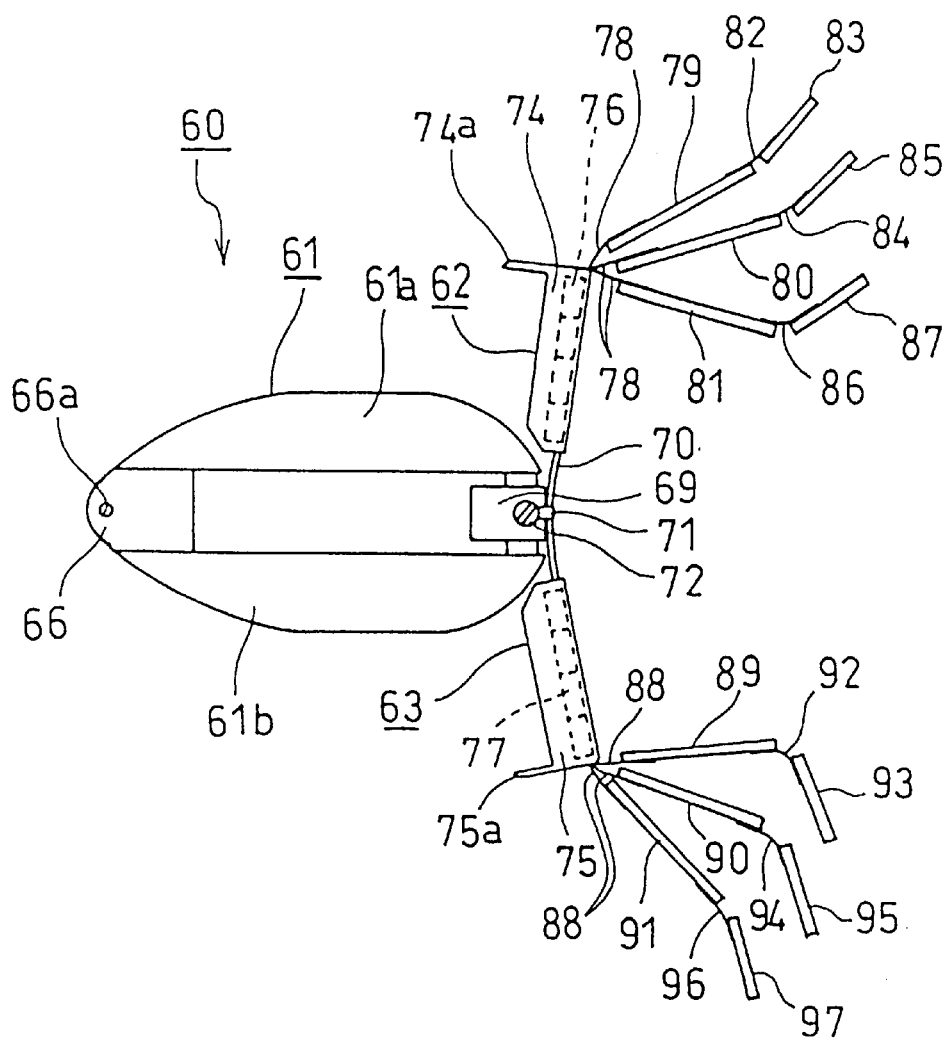
FIG. 7 is a plan view showing a lure according to a third embodiment of the invention.
Figure 8:
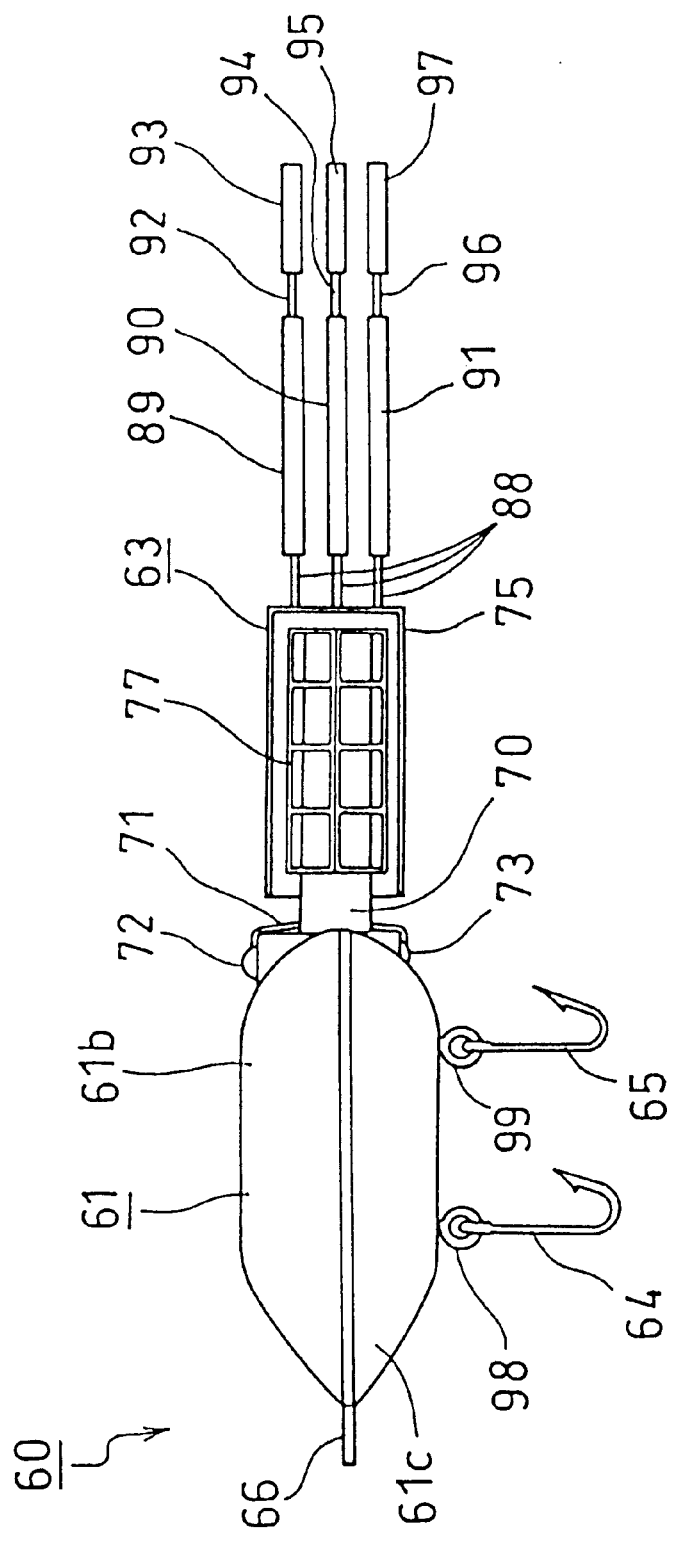
FIG. 8 is a right side view showing the lure according to the third embodiment.

A lure 60 according to a third embodiment is described next. This lure 60 is constituted, as shown in FIG. 7, of a body 61, a first leg 62, a second leg 63, a first hook 64, and a second hook 65 (see, FIG. 8). The body 61 is constituted of a flat plate 66 molded into a plate from aluminum having an rectangular opening in the center, a first body portion 61a made to adhere to an upper and one side of the flat plate 66, a second body portion, not shown, made to adhere to an a lower and one side of the flat plate 66, a third body portion 61b made to adhere to an upper and the other side of the flat plate 66, and a fourth body portion 61c made to adhere to an a lower and the other side of the flat plate 66. Those first to fourth body portions 61a, 61b, 61c are uniformly molded from wood in the same shape. The first and the third body portions 61a, 61b, and the second and the fourth body portions 61c are opposing with the same space as the width of the opening in the flat plate 66. A lead weight, not shown, is secured to the bottom of the second body portion and fourth body portion 61c to adjust floating force of the entire lure 60. A quadratic prism shaped leg support 69 made of wood is attached to a rear end of the flat plate 61. A strip elastic portion 70 made of a rectangular rubber plate, constituting the first and second legs 62, 63 is fixed at a center of the elastic portion 70 to a rear end of the leg support 69 by a metal fitting 71 whose one end is fixed by one screw 72 and the other end is fixed by the other screw 73. One water receiving portion 74 having a water receiving face extending perpendicular to a lure proceeding direction is secured to one end of the elastic portion 70, and the other water receiving portion 75 having a water receiving face extending perpendicular to a lure proceeding direction is secured to the other end of the elastic portion 70. These water receiving portions 74, 75 have a conduit-like shape whose concave surface faces toward the proceeding direction of the lure 60 where a lure proceeding direction side of the round surface of a resin molded cylinder is cut away from one end to the other end. One and the other contact portions 74a, 75a to which water entered in the one and the other water receiving portions 74, 75 contacts when the lure 60 is manipulated toward the proceeding direction are formed at the distal ends of the one and the other water receiving portions 74, 75, respectively. The one and the other contact portions 74a, 75a have a circle shape, extend perpendicular to the axial directions of the one and the other water receiving portions 74, 75, respectively, and are in contact with water entered in the one and the other water receiving portions 74, 75 to maintain water resistance. One grid shaped block 76 is fixed to the inside of the one water receiving portion 74 as shown in FIG. 8, and the other grid shaped block 77 is fixed to the inside of the one water receiving portion 75. The one and the other blocks 76, 77 have a plurality of partition plates (reference numbers are omitted) as shown in FIG. 8, and those partition plates operate, as well as the one and the other contact portions 74a, 75a, to maintain water resistance. Stick type wooden strips 79, 80, 81 are flexibly attached to the contact portion 74a by a cloth connecting portion 78. A stick type wooden strip 83 is flexibly attached to the wooden strip 79 by a cloth connecting portion 82; a stick type wooden strip 85 is flexibly attached to the wooden strip 80 by a cloth connecting portion 84; a stick type wooden strip 87 is flexibly attached to the wooden strip 81 by a cloth connecting portion 86. Stick type wooden strips 89, 90, 91 are flexibly attached to the contact portion 75a by a cloth connecting portion 88. A stick type wooden strip 93 is flexibly attached to the wooden strip 89 by a cloth connecting portion 92; a stick type wooden strip 95 is flexibly attached to the wooden strip 90 by a cloth connecting portion 94; a stick type wooden strip 97 is flexibly attached to the wooden strip 91 by a cloth connecting portion 96. A through hole 66a for connecting a fishing line is formed at a tip of the flat plate 66. The first hook 64 is as shown in FIG. 8 attached to a middle portion of the bottom of the second and fourth body portions 61c by a first anchor 98 whose tip is in a ring shape, and the second hook 65 is attached by a second anchor 99 whose tip is in a ring shape.

Figure 9:
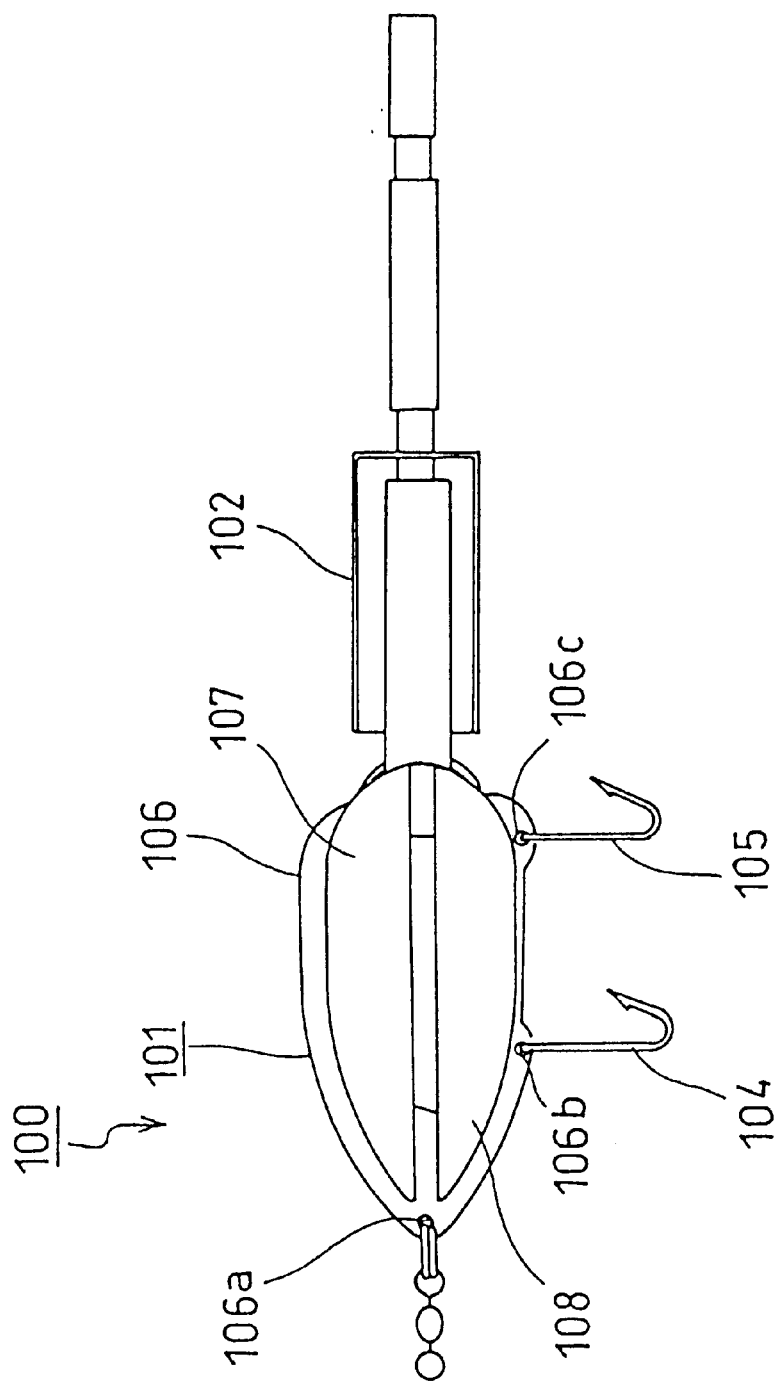
FIG. 9 is a right side view showing the lure according to a fourth embodiment of the invention.
Figure 10:
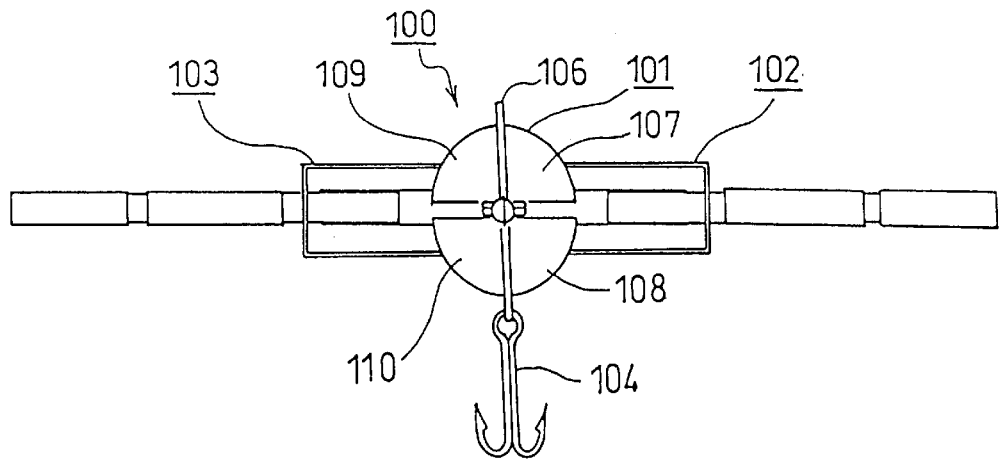
FIG. 10 is a front view showing the lure according to the fourth embodiment.

A lure 100 according to a fourth embodiment is described next. This lure 100 is constituted of a body 101 as shown in FIG. 9, a first leg 102, a second leg 103, a first hook 104, and a second hook 105 as shown in FIG. 10. The body 101 is molded of aluminum and constituted of a flat plate 106 approximately in an egg shape at the center of which an approximately trapezoid opening is drilled, a first body portion 107 made to adhere on an upper right side of the middle portion of the flat plate 106, a second body portion 108 made to adhere on a lower right side of the middle portion of the flat plate 106 with a space from the body portion 107, a third body portion 109 made to adhere on an upper left side of the middle portion of the flat plate 106, and a fourth body portion 110 made to adhere on a lower left side of the middle portion of the flat plate 106 with a space from the third body portion 109. The first to fourth body portions are made of wood in the same shape. A lead weight not shown is attached at the bottom of the second and fourth body portions 108, 110 to adjust floating force when the lure 100 is cast to the water surface. The first and second legs 102, 103 having the same structure as those of the lure 1 of the first embodiment are attached to a rear end of the flat plate 106. A first through hole 106a is formed as shown in FIG. 9 at the tip of the flat plate 106 to connect a fishing line not shown. Second and third through holes 106b and 106c are formed as shown in FIG. 9 below the flat plate 106. The first hook 104 is attached to the through hole 106b, and the second hook 105 is attached to the through hole 106c.

Figure 11:
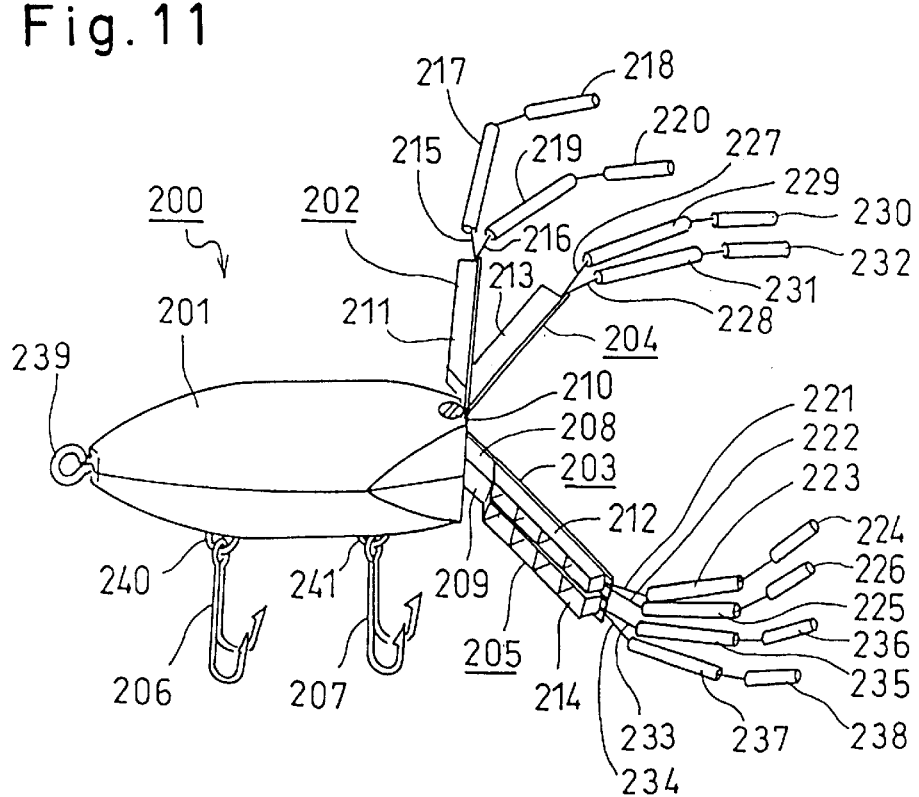
FIG. 11 is a perspective view showing a lure according to a fifth embodiment of the invention.

A lure 200 according to a fifth embodiment is described next. This lure 200 has symmetric right and left shapes as shown in FIG. 11. The lure 200 is constituted of a wooden body 201 in substantially a spindle shape, first to fourth legs 202, 203, 204, 205, a first hook 206, and a second hook 207. A first elastic portion 208 made of a rectangular rubber plate, constituting the first and second legs 202, 203 and a second elastic portion 209 made of a rectangular rubber plate, constituting the first and second legs 202, 203, are fixed at a center of the elastic portions 208, 209 to a rear end of the body 201 by a metal fitting, not shown, whose opposing ends are fixed by one screw 210 as shown in FIG. 11, and the other screw not shown. A first grid block 211 is fixed to one end of the first elastic portion 208 in having an opening directing the proceeding direction, and a second grid block 212 is fixed to the other end of the first elastic portion 208 in having an opening directing the proceeding direction. A third grid block 213 is fixed to one end of the second elastic portion 209 in having an opening directing the proceeding direction, and a second grid block 214 is fixed to the other end of the second elastic portion 209 in having an opening directing the proceeding direction. A plurality of partition plates (reference numbers are omitted) is formed inside the first to fourth grid blocks 211, 212, 213, 214, and when the lure 200 is manipulated to move in the lure proceeding direction, water that entered in the first to fourth grid blocks 211, 212, 213, 214, contacts to the plates to maintain the water resistance. Connecting strings 215, 216 to attached to the first grid block 211. A pipe 217 molded from a resin is attached to a proximal side of the connecting string 215, and a pipe 218 molded from a resin is attached to the other side of the connecting string 215. A pipe 219 molded from a resin is attached to a proximal side of the connecting string 216, and a pipe 220 molded from a resin is attached to the other side of the connecting string 216. Connecting strings 221, 222 are attached to the second grid block 212. A pipe 223 molded form a resin is attached to a proximal side of the connecting string 221, and a pipe 224 molded from a resin is attached to the other side of the connecting string 221. A pipe 225 molded from a resin is attached to a proximal side of the connecting string 222, and a pipe 226 molded from a resin is attached to the other side of the connecting string 222. Connecting strings 227, 228 are attached to the third grid block 213. A pipe 229 molded from a resin is attached to a proximal side of the connecting string 227, and a pipe 230 molded from a resin is attached to the other side of the connecting string 227. A pipe 231 molded from a resin is attached to a proximal side of the connecting string 228, and a pipe 232 molded from a resin is attached to the other side of the connecting string 228. Connecting strings 233, 234 are attached to the fourth grid block 214. A pipe 235 molded from a resin is attached to a proximal side of the connecting string 233, and a pipe 236 molded form a resin is attached to the other side of the connecting string 233. A pipe 237 molded form a resin is attached to a proximal side of the connecting string 234, and a pipe 237 molded from a resin is attached to the other side of the connecting string 234. A first anchor 239 whose tip is in a ring shape is secured to a front end of the body 201 to connect a fishing line, not shown, and the first hook 206 is attached to a bottom of the body 201 by a second anchor 240 whose tip is in a ring shape, as well as the second hook 207 is attached by a third anchor 241 whose tip is in a ring shape.

Figure 12:
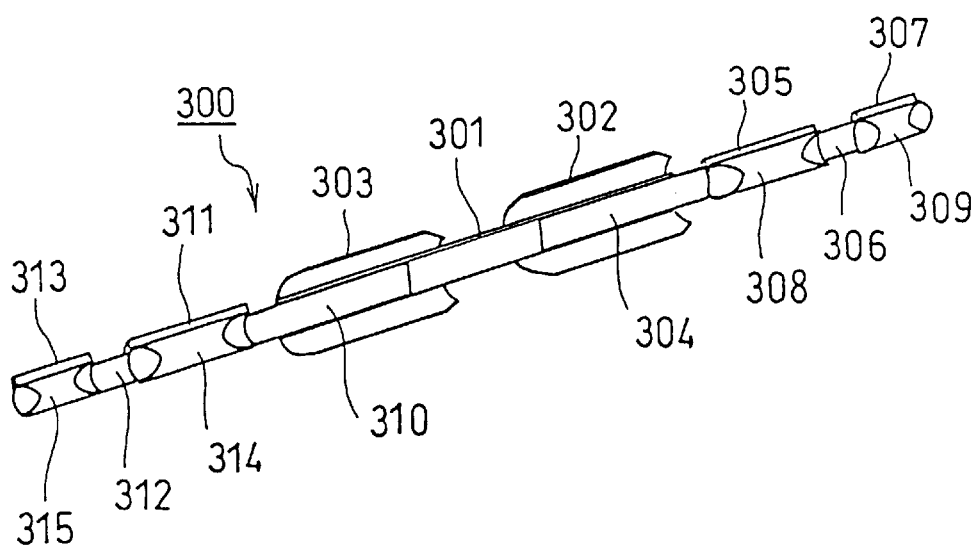
FIG. 12 is a perspective view showing a different configuration of a leg constituting a lure according to the invention.

The legs constituting this invention can be made of those not only as shown in the above embodiments but also as shown in FIG. 12. The leg 300 is constituted, as shown in FIG. 12, of an elastic portion 301 made of a rectangular rubber plate 301, one water receiving portion 302 formed on one end of the elastic portion 301 in having a water receiving face extending perpendicular to the lure proceeding direction, and the other water receiving portion 303 formed on the other end of the elastic portion 301 in having a water receiving face extending perpendicular to the lure proceeding direction. A wooden strip 305 is flexibly attached to one end of the elastic portion 301 by a cloth connecting portion 304, and a wooden strip 307 is flexibly attached to the wooden strip 305 by a cloth connecting portion 306. A pipe shaped water passing member 308 whose opposing ends are cut in a V shape is attached to one end of the wooden strip 305, and a pipe shaped passing member 309 whose opposing ends are cur in a V-shape is attached to one end of the wooden strip 307. A wooden strip 311 is flexibly attached to the other end of the elastic portion 301 by a cloth connecting portion 310, and a wooden strip 313 is flexibly attached to the wooden strip 311 by a cloth connecting portion 312. A pipe shaped water passing member 314 whose opposing ends are cut in a V shape is attached to one end of the wooden strip 311, and a pipe shaped passing member 315 whose opposing ends are cur in a V-shape is attached to one end of the wooden strip 313.

Figure 13:
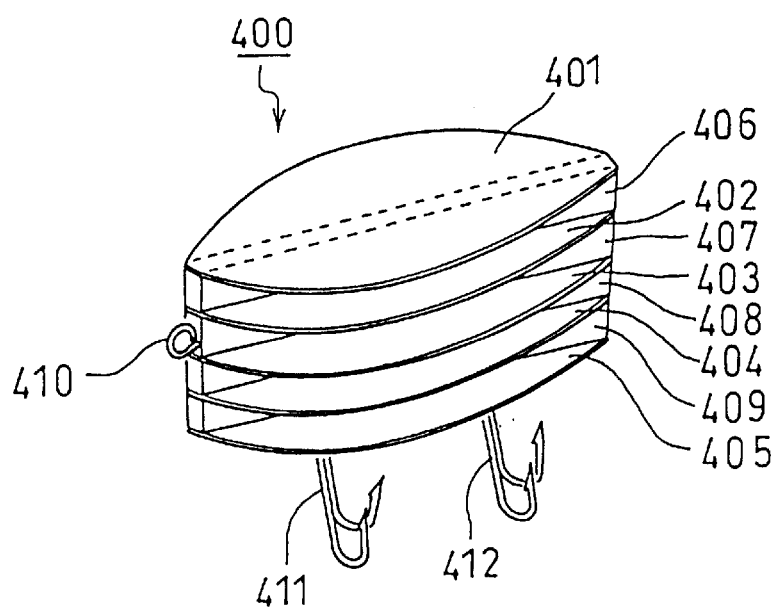
FIG. 13 is a perspective view showing a different configuration of a body constituting a lure according to the invention.
Figure 14:
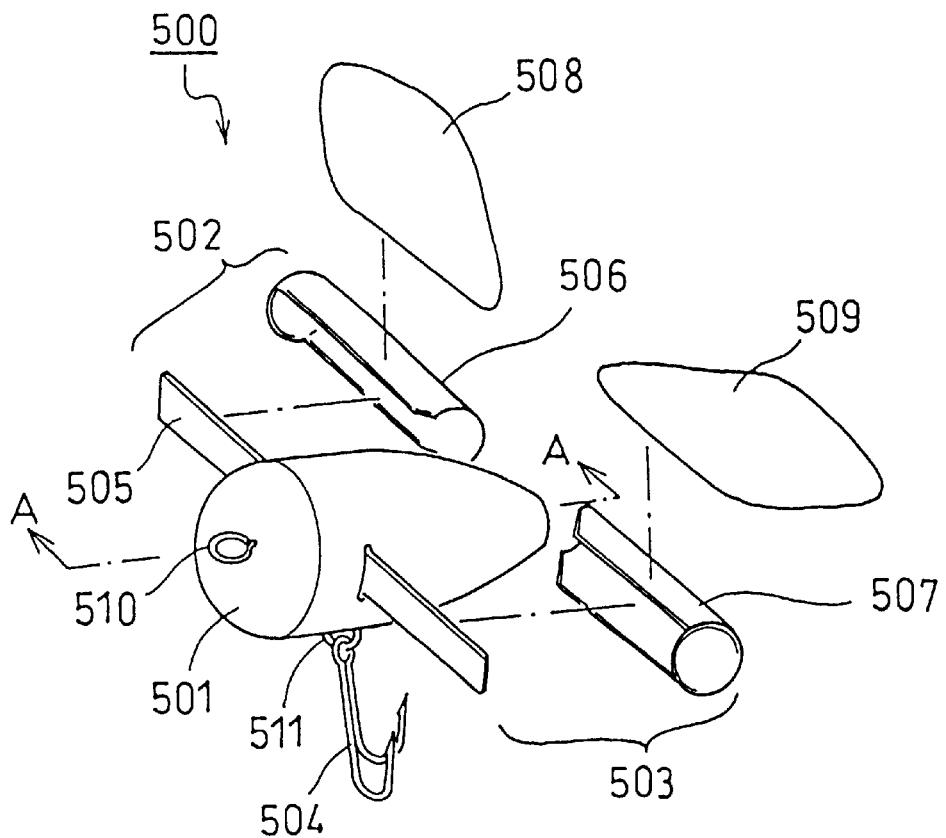
FIG. 14 is an exploded perspective view showing a lure according to a sixth embodiment of the invention.

The body constituting this invention can be made of those not only as shown in the above embodiments but also as shown in FIG. 13. The body 400 is, as shown in FIG. 14, made by stacking resin molded, oval first to fifth flat plates 401, 402, 403, 404, 405 in placing first to fourth rectangular prism shaped spacers 406, 407, 408, 409 extending in the longitudinal direction of the flat plates and has four spaces on left and right sides of the body. An anchor is secured to one end of the second spacer 407 to connect a fishing line not shown, and first and second hooks 411, 412 are attached to the bottom of the fifth flat plate 405 by anchors not shown. Although the five flat plates are made to adhere to each other by the four spacers in this embodiment, the number of the flat plate is not limited to five sheets and may be four or less or six or more. As other configurations of the lure body, a pipe shaped water passing member, not shown, whose opposing ends are opened, can be formed on right and left sides of the wooden molded body.

Figure 15:
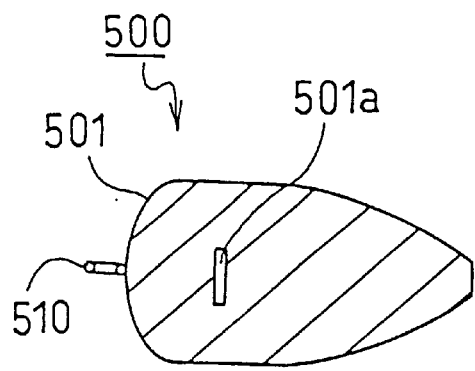
FIG. 15 is a cross section taken along A—A line in FIG. 14.

A lure 500 according to a sixth embodiment is described next. This lure 500 is constituted, as shown in FIG. 14, a wooden body 501 in substantially a spindle shape, first to second legs 502, 503, and a hook 504. A through hole 501a (see, FIG. 15) is formed in a middle portion on a front end side of the body 501, and an elastic portion 505 molded of a rectangular rubber plate is secured in penetrating the through hold 501a having thicknesses on upper and lower sides. One water receiving portion 506 is secured to one end of the elastic portion 505, and the other water receiving portion 507 is secured to the other end of the elastic portion 507. The one and the other water receiving portions 506, 507 have substantially the same shapes as the one and the other water receiving portions 11, 12 constituting the lure 1 in the first embodiment. A first wing plate 508 is made to adhere to an upper side of the water receiving portion 506, and a second wing plate 509 is made to adhere to an upper side of the water receiving portion 507. A first anchor 510 is secured to a front end of the body 501 to connected a fishing line, not shown, and the hook 504 is attached to the bottom of the middle portion of the body 501 by a second anchor 511.

Figure 16:
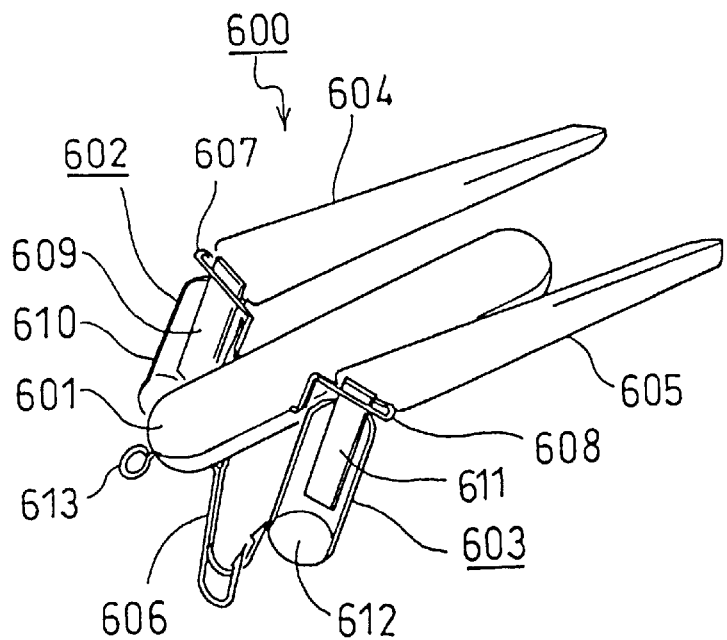
FIG. 16 is a perspective view showing a lure according to a seventh embodiment of the invention.
Figure 17:
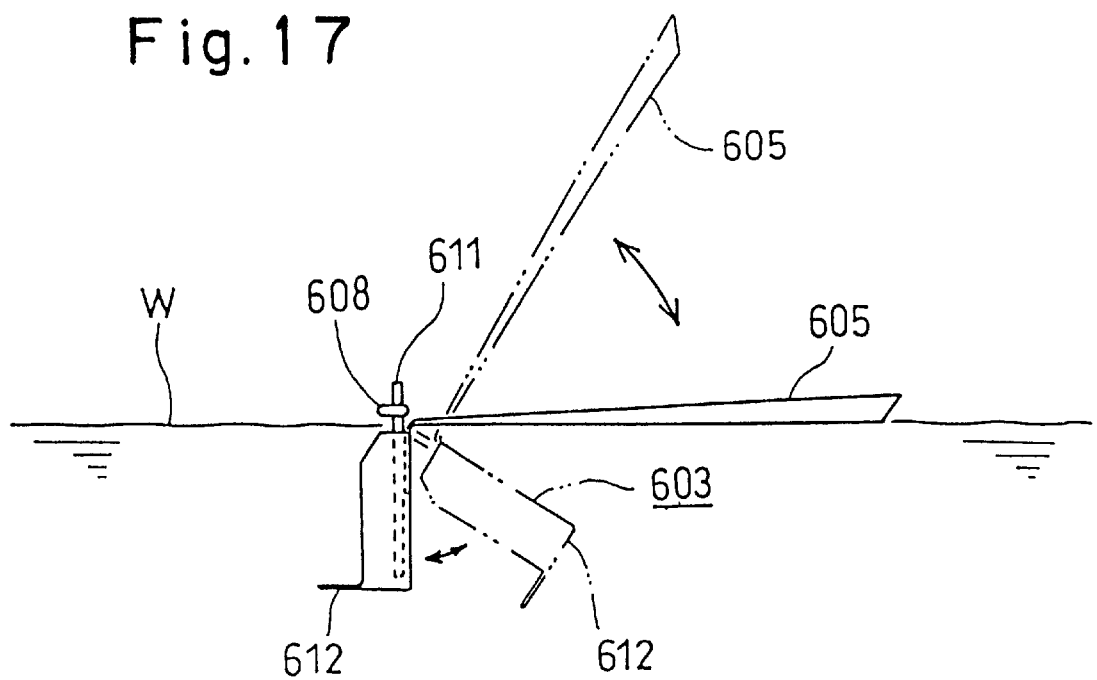
FIG. 17 is a perspective view showing water surface motions of the lure according to the seventh embodiment.

A lure 600 according to a seventh embodiment is described next. This lure 600 is constituted, as shown in FIG. 16, of a cylindrical body 601 made of wood, whose opposing ends are fabricated in a hemisphere shape, a first leg 602, a second leg 603, a first wing plate 604, a second wing plate 605, and a hook 606. First and second leg supports 607, 608 molded in an L-shape are attached on front right and front left sides of the body 601. A first elastic portion 609 made of a rectangular rubber plate constituting the first leg 602 is attached to the first leg support 607 as to extend downward from the wing plate 604, and one water receiving portion 610 on which a water receiving face is formed to extend in a perpendicular direction to the lure proceeding direction is attached to the first elastic portion 609. A second elastic portion 611 made of a rectangular rubber plate constituting the second leg 603 is attached to the second leg support 608 as to extend downward from the wing plate 605, and the other water receiving portion 612 on which a water receiving face is formed to extend in a perpendicular direction to the lure proceeding direction is attached to the second elastic portion 611. The one and the other water receiving portions 610, 612 notedly have substantially the same shapes as the one and the other water receiving portions 11, 12 constituting the lure 1 in the first embodiment. The first wing plate 604 is attached to the one water receiving portion 610, and the second wing plate 605 is attached to the other water receiving portion 612. An anchor 613 is secured to a front end of the body 601 for connecting a fishing line not shown, and a hook 606 is attached to a middle bottom of the body 601 by an anchor not shown. When the lure 600 is manipulated in the lure proceeding direction, the one and the other water receiving portions 610, 612 and the one and the other wing plates 604, 605 move to a position indicated by the two-dot chain line in FIG. 17 by water resistance entered in the one and the other water receiving portions 610, 612. When the lure 600 stops proceeding, the one and the other water receiving portions 610, 612 and the one and the other wing plates 604, 605 come back to a position indicated by a solid line in FIG. 17 by elastic force of the first and second elastic portions 609, 611, so that the one and the other wing plates 604, 605 strike the water surface W at that time, thereby producing sounds and bubbles. When this manipulation of the lure 600 is repeated, the lure 600 can move at the water surface in producing sounds and bubbles, thereby stimulating and attracting fish underwater.

Figure 18:
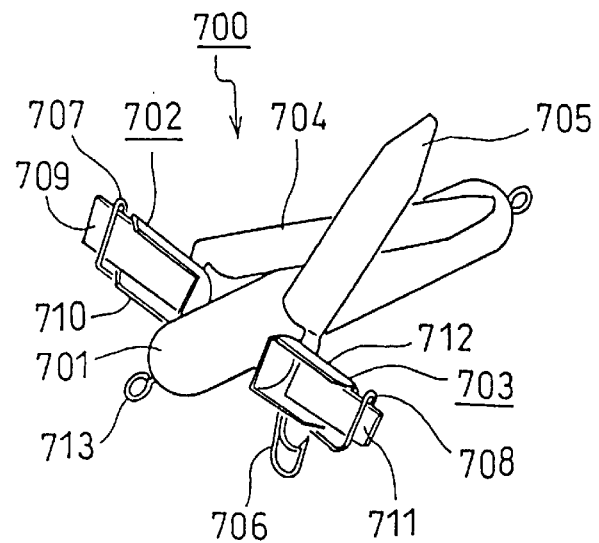
FIG. 18 is a perspective view showing a lure according to an eighth embodiment of the invention.
Figure 19:
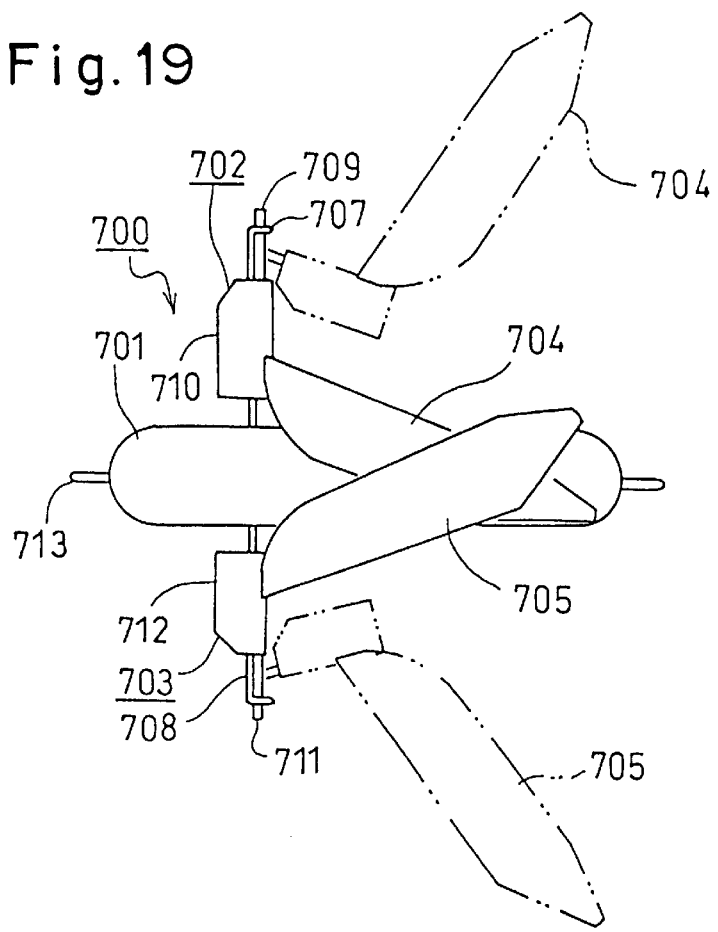
FIG. 19 is a perspective view showing water surface motions of the lure according to the eighth embodiment.
Figure 20:
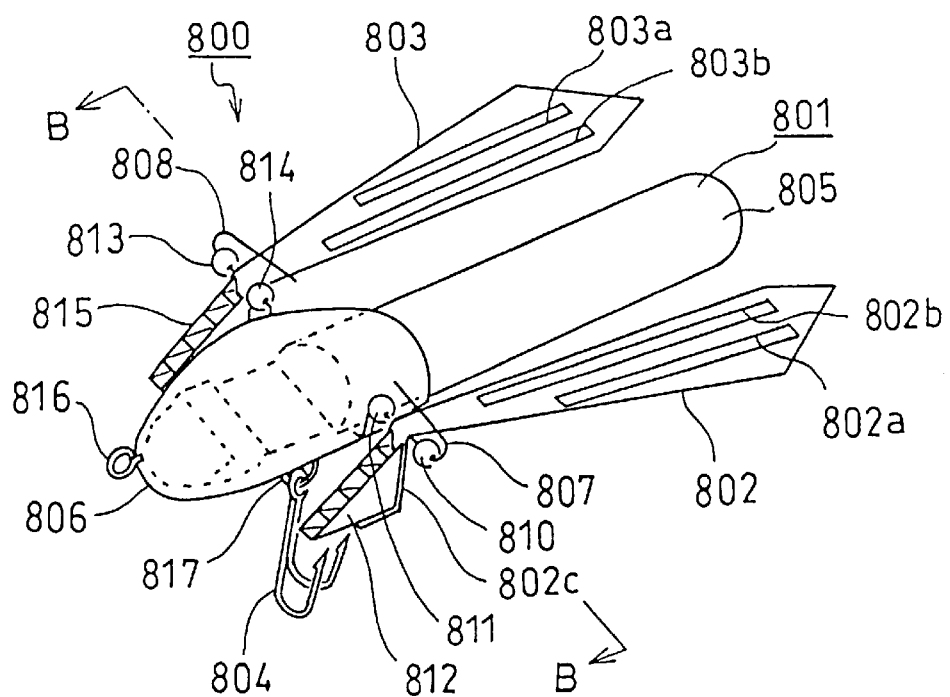
FIG. 20 is a perspective view showing a lure according to a ninth embodiment of the invention.

A lure 700 according to an eighth embodiment is described next. This lure 700 is constituted, as shown in FIG. 18, of a cylindrical body 701 made of wood, whose opposing ends are fabricated in a hemisphere shape, a first leg 702, a second leg 703, a first wing plate 704, a second wing plate 705, and a hook 706. First and second leg supports 707, 708 molded in an L-shape are attached on front right and front left sides of the body 701. A first elastic portion 709 made of a rectangular rubber plate constituting the first leg 702 is attached to the first leg support 707 as to extend inward, and one water receiving portion 710 on which a water receiving face is formed to extend in a perpendicular direction to the lure proceeding direction is attached to the first elastic portion 709. A second elastic portion 711 made of a rectangular rubber plate constituting the second leg 703 is attached to the second leg support 708 as to extend inward, and the other water receiving portion 712 on which a water receiving face is formed to extend in a perpendicular direction to the lure proceeding direction is attached to the second elastic portion 711. The one and the other water receiving portions 710, 712 notedly have substantially the same shapes as the one and the other water receiving portions 11, 12 constituting the lure 1 in the first embodiment. The first wing plate 704 is attached to a distal end of the one water receiving portion 710 (on a side of the body 701), and the second wing plate 705 is attached to a distal end of the other water receiving portion 712 (on a side of the body 701). An anchor 713, not shown, for connecting a fishing line not shown is fixed to a front end of the body 701, and the hook 706 is attached to a middle bottom of the body 701 by an anchor not shown. When the lure 700 is manipulated in the lure proceeding direction, the one and the other water receiving portions 710, 712 and the one and the other wing plates 704, 705 expand toward right and left sides to a position indicated by the two-dot chain line in FIG. 19 by water resistance entered in the one and the other water receiving portions 710, 712. When the lure 700 stops proceeding, the one and the other water receiving portions 710, 712 and the one and the other wing plates 704, 705 come back to a position indicated by a solid line in FIG. 19 by elastic force of the first and second elastic portions 709, 711, so that the one and the other wing plates 704, 705 push aside the water surface at that time, thereby producing sounds and bubbles. When this manipulation of the lure 700 is repeated, the lure 700 can move at the water surface in producing sounds and bubbles, thereby stimulating and attracting fish underwater.

Figure 21:
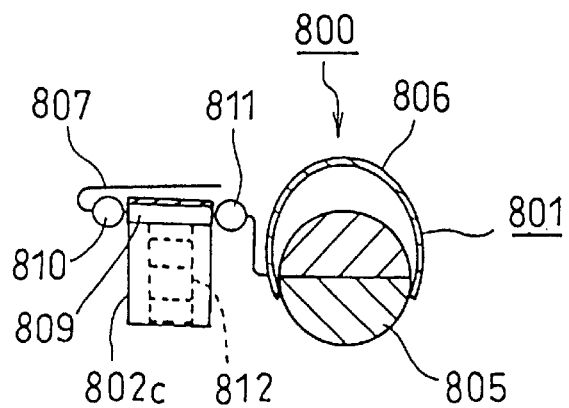
FIG. 21 is a cross section taken along B—B line in FIG. 20.

A lure 800 according to a ninth embodiment is described next. This lure 800 is constituted, as shown in FIG. 21, of a cylindrical body 801, a first wing plate 802, a second wing plate 803, and a hook 804. The body 801 is constituted of a wooden molded cylindrical belly 805, and a transparent resin molded hollow head 806 mounted on a top of the belly 805. The belly 801 is formed with one and the other wing plate supports 807, 808, whose proximal end is secured to the belly 805, which is inserted in a through hole not shown formed at a middle portion to penetrate the opposing sides of the head 806. The one wing plate support 807 is inserted through one hollow cylinder member 809 to be pivotally move as shown in FIG. 21, and first and second bead like stoppers 810, 811 are attached to the support 807 to prevent the cylinder member 809 from shifting left or right. The first wing plate 802 having two slits 802a, 802b is attached to the one cylinder member 809. The proximal end of the wing plate 802 forms a water receiving portion support 802c extended in an L-shape when viewed to the side, and one water receiving portion 812 in a triangle shape when viewed to the side is formed with a grid opening on its front side. The other wing plate support 808 is inserted through the other hollow cylinder member, not shown, to be pivotally move, and third and fourth bead like stoppers 813, 814 are attached to the support 808 to prevent the cylinder member from shifting left or right. The other wing plate 803 having two slits 803a, 803b is attached to the other cylinder member. The proximal end of the wing plate 803 forms a water receiving portion support 802c extended in an L-shape when viewed to the side, and one water receiving portion 815 in a triangle shape when viewed to the side is formed with a grid opening on its front side. A plurality of partition plates (reference numbers are omitted) is formed inside the one and the other water receiving portions 812, 815, and water that entered in the one and the other water receiving portions 812, 815 contacts to the plates, thereby maintaining the water resistance. An anchor 816 whose proximal end is fixed to a front end of the belly 805 as penetrated a through hole not shown is secured to a front end of the body 801. This anchor 816 is for connecting a fishing line not shown. The hook 804 is attached by an anchor 817 at a middle bottom of the belly 805. When the lure 800 is manipulated in the proceeding direction, the one and the other wing plates are popped up by resistance of water entered in the one and the other water receiving portions 812, 815. When the lure 800 stops proceeding, the one and the other wing plates are struck down to the water surface by rotation of the one cylinder member 809 and the other cylinder member not shown, thereby producing sounds and bubbles.

Figure 22:
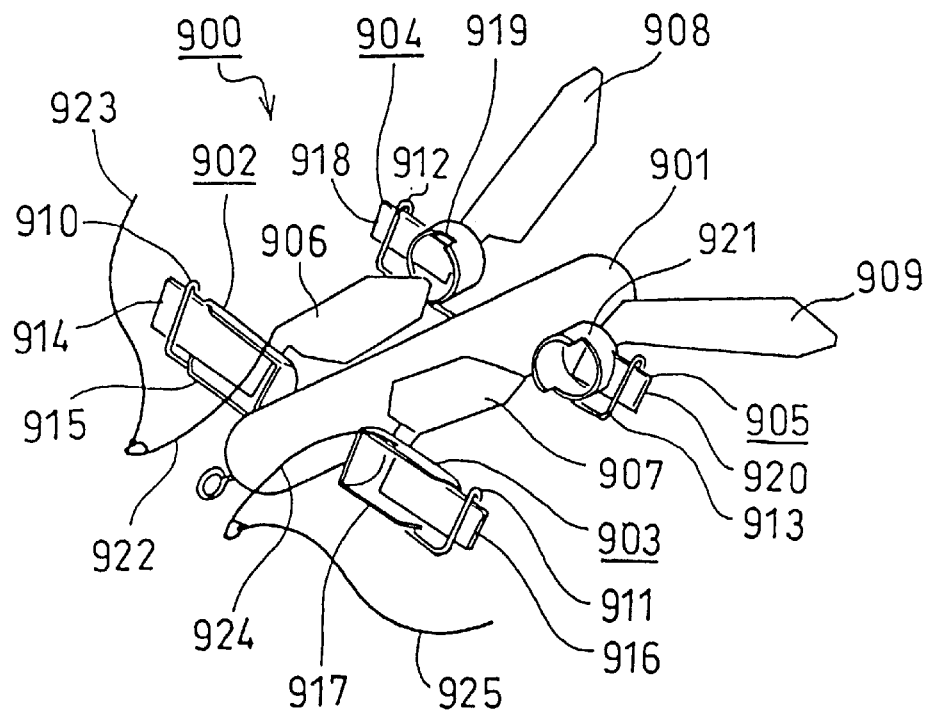
FIG. 22 is a perspective view showing a lure according to a tenth embodiment of the invention.

A lure 900 according to a tenth embodiment is described next. This lure 900 is constituted, as shown in FIG. 22, of a cylindrical body 901 made of wood, whose opposing ends are fabricated in a hemisphere shape, first to fourth legs 902, 903, 904, 905, and first to fourth wing plates 906, 907, 908, 909. First and second leg supports 910, 911 are fixed at a middle portion on a front side of the body 901. Third and fourth leg supports 912, 913 are fixed at a middle portion on a rear side of the body 901. A first elastic portion 914 made of a rectangular rubber plate constituting the first leg 902 is attached to the first leg support 910, and a first water receiving portion 915 on which a water receiving face is formed to extend in a perpendicular direction to the lure proceeding direction is attached to the first elastic portion 914. A second elastic portion 916 made of a rectangular rubber plate constituting the second leg 903 is attached to the second leg support 911, and a second water receiving portion 917 on which a water receiving face is formed to extend in a perpendicular direction to the lure proceeding direction is attached to the second elastic portion 916. The first and second water receiving portions 915, 917 notedly have substantially the same shapes as the one and the other water receiving portions 710, 712 constituting the lure 700 in the eighth embodiment. The first wing plate 906 is attached behind the first water receiving portion 915, and the second wing plate 907 is attached behind the second water receiving portion 917. A third elastic portion 918 made of a rectangular rubber plate constituting the third leg 904 is attached to the third leg support 912, and a third water receiving portion 919 on which a water receiving face is formed to extend in a perpendicular direction to the lure proceeding direction is attached to the third elastic portion 918. A fourth elastic portion 920 made of a rectangular rubber plate constituting the fourth leg 904 is attached to the fourth leg support 913, and a fourth water receiving portion 921 on which a water receiving face is formed to extend in a perpendicular direction to the lure proceeding direction is attached to the fourth elastic portion 920. The third and fourth water receiving portions 919, 921 are in a cylindrical shape opening on a side of the proceeding direction, and their round surfaces on the side of the body 901 extend forward. The third wing plate 908 is attached behind the third water receiving portion 919 and the fourth wing plate 909 is attached behind the fourth water receiving portion 921. A first antenna support 922 is attached to an upper surface of the first water receiving portion 915, and a first antenna 923 is attached to the distal end of the first antenna support 922. A second antenna support 924 is attached to an upper surface of the first water receiving portion 917, and a second antenna 925 is attached to the distal end of the first antenna support 924. The lure 900 is a modification of the lure 700 according to the eighth embodiment but has more movable portions, and therefore can produce complicated sounds, splashes, and bubbles while moving and can stimulate and attract fish hiding in a place further far away.

A lure 1000 according to an eleventh embodiment is described next.

Figure 23:
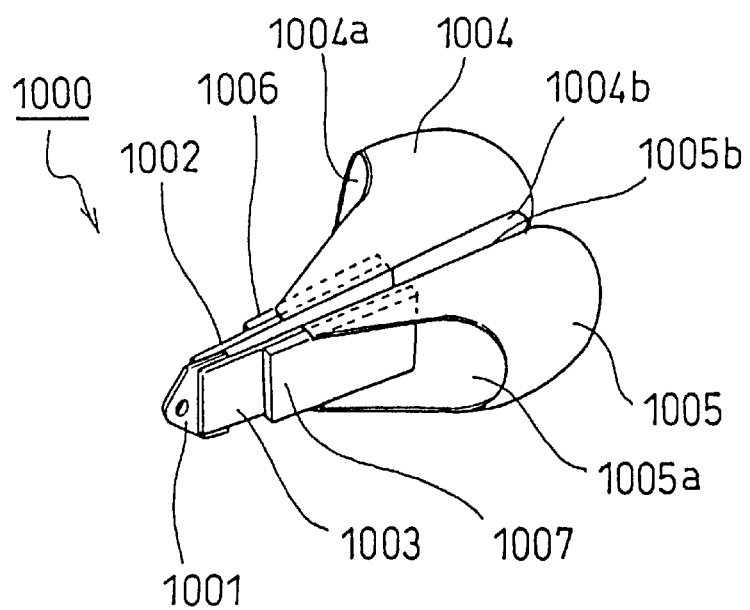
FIG. 23 is a perspective view showing a lure according to an eleventh embodiment of the invention.

This lure 1000 is constituted, as shown in FIG. 23, of an elastic support 1001 molded of a metal, a first elastic portion 1002 made of a rectangular rubber plate, a second elastic portion 1003, a first water receiving portion 1004, and a second water receiving portion 1005. The first and second elastic portions 1002, 1003 are attached to the elastic support 1001 as to sandwich the elastic support 1001 at their proximal ends, and extend in curving outward, respectively. A first water receiving portion support 1006 molded of a rectangular wood is attached to the other end of the first elastic portion 1002, and the first water receiving portion 1004 is attached to the one end of the first water receiving portion support 1006. A second water receiving portion support 1007 molded of a rectangular wood is attached to the other end of the second elastic portion 1003, and the second water receiving portion 1005 is attached to the one end of the second water receiving portion support 1007. A first opening 1004a is formed toward the lure proceeding direction on one side of the first water receiving portion 1004, and a second opening 1004b for flowing out water entered in the first water receiving portion 1004 from the first opening 1004a is formed on the other side of the first water receiving portion 1004. A third opening 1005a is formed toward the lure proceeding direction on one side of the second water receiving portion 1005, and a fourth opening 1005b for flowing out water entered in the third water receiving portion 1005 from the third opening 1005a is formed on the other side of the second water receiving portion 1005. When the lure 1000 is manipulated in the lure proceeding direction, water enters in the first and second water receiving portion 1004, 1005 by way of the first and third openings 1004a, 1005a and then flows our of the second and fourth openings 1004b, 1005b. The first and second water receiving portions 1004, 1005 extend right and left as shown by a solid line in FIG. 24. When the lure 1000 stops proceedings, the first and second water receiving portions 1004, 1005 come back to a position shown a two-dot chain line in FIG. 23 by elastic force of the first and second elastic portions 1002, 1003.

A lure 1100 according to a twelfth embodiment is described next.

Figure 24:
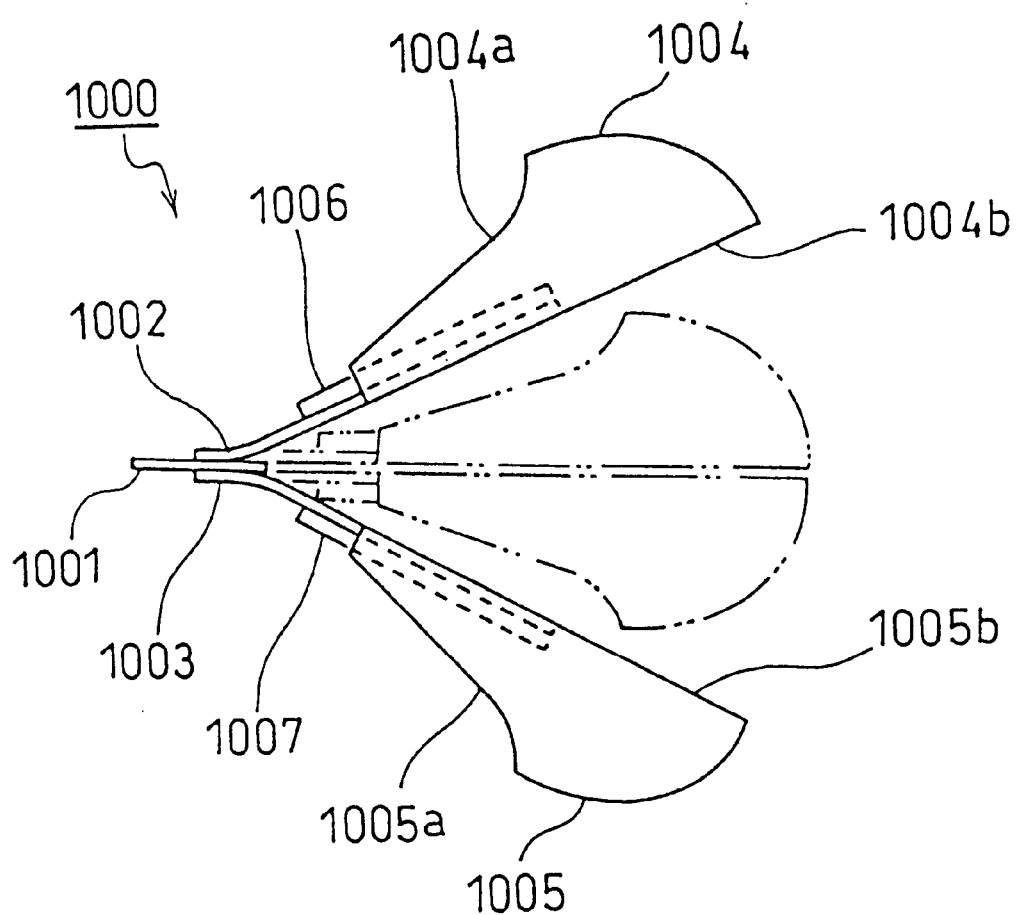
FIG. 24 is a plan view showing motions of the lure according to the eleventh embodiment.
Figure 25:
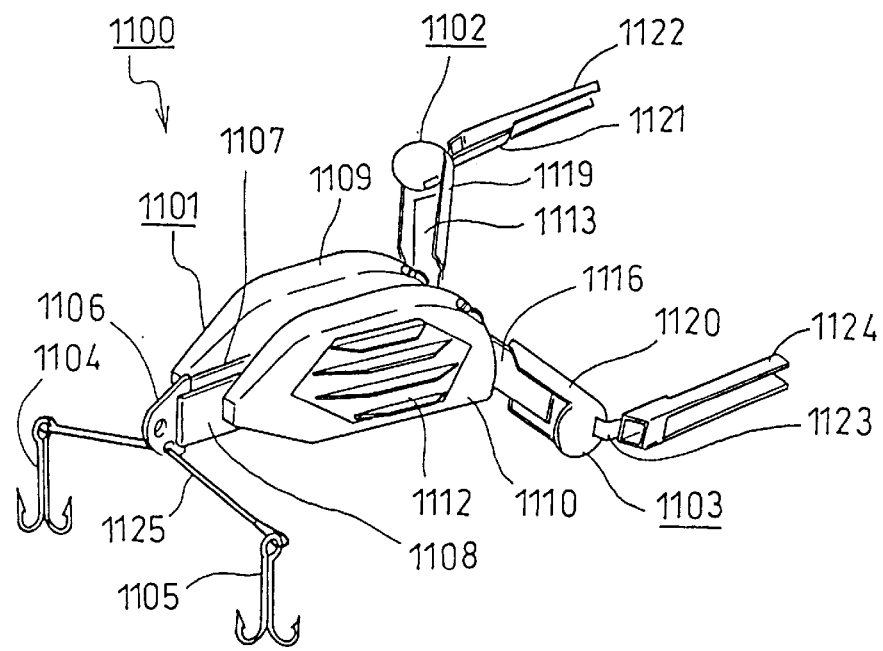
FIG. 25 is a perspective view showing a lure according to a twelfth embodiment of the invention.
Figure 26:
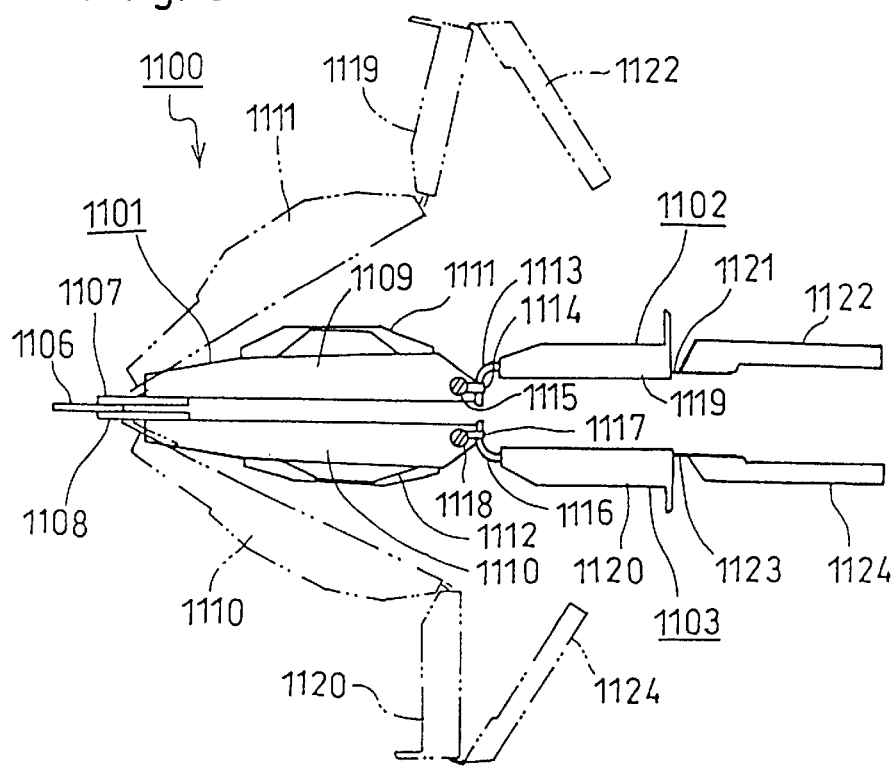
FIG. 26 is a plan view showing motions of the lure according to the twelfth embodiment.

This lure 1100 is constituted, as shown in FIG. 24, of a body 1101, a first leg 1102, a second leg 1103, a first hook 1104, and a second hook 1105. The body 1101 is constituted of a metal molded elastic support 1106, first and second elastic portions 1107, 1108 made of rectangular rubber plates attached as to sandwich the elastic support 1106 from both sides of the support with proximal ends of the portions, a first body 1109 attached outside the first elastic portion 1107, and a second body 1110 attached outside the second elastic portion 1108. The first and second elastic portions 1107, 1108 are attached in a state curving outward, respectively. As shown in FIG. 26, a resin molded water passing member 1111 is attached to an outer surface of the first body 1109, and a resin molded water passing member 1112 is attached to an outer surface of the second body 1110. Four partition plates (reference numbers are omitted) extending outward are formed as shown in FIG. 25 on the first and second water passing members 1111, 1112. A third elastic portion 1113 constituting the first leg 1102 is fixed as shown in FIG. 26 to a rear end of the first body 1109 at the proximal end of the third elastic portion 1113 by a metal fitting 1114 whose one end is secured by one screw 1115 and whose other end is secured by the other screw not shown. A fourth elastic portion 1116 constituting the second leg 1103 is fixed as shown in FIG. 26 to a rear end of the second body 1110 at the proximal end of the fourth elastic portion 1116 by a metal fitting 1117 whose one end is secured by one screw 1118 and whose other end is secured by the other screw not shown. A first water receiving portion 1119 is attached to the other end of the third elastic portion 1113, and a second water receiving portion 1120 is attached to the other end of the fourth elastic portion. The first and second water receiving portions 1119, 1120 notedly have substantially the same shapes as the one and the other water receiving portions 11, 12 constituting the lure 1 in the first embodiment. A first resin piece 1122 divided from the proximal end to the distal end into two branches is flexibly attached to the distal end of the first water receiving portion 1119 by a cloth connecting portion 1121, and a second resin piece 1124 divided from the proximal end to the distal end into two branches is flexibly attached to the distal end of the second water receiving portion 1120 by a cloth connecting portion 1123. A hook support 1125 is attached to the bottom of the elastic support 1106, and the first hook 1104 is attached to one end of the hook support 1125, where the second hook 1105 is attached to the other end of the hook support 1125. When the lure 1100 is manipulated in the lure proceeding direction, the first and the second bodies 1109, 1110 and the first and second legs 1102, 1103 extend in a solid line in FIG. 26 in parallel to the lure proceeding direction. When the lure stops proceeding, the third and fourth elastic portions 1113, 1116 come back to the original position indicated by a two-dot chain line shown in FIG. 26, and distal ends of the first and second resin pieces 1122, 1124 come closer to the first and second water receiving portions 1119, 1120. The first and second bodies 1109, 1110 extend so that the rear ends become separated from each other.

A lure 1200 according to a thirteenth embodiment is described next.

Figure 27:
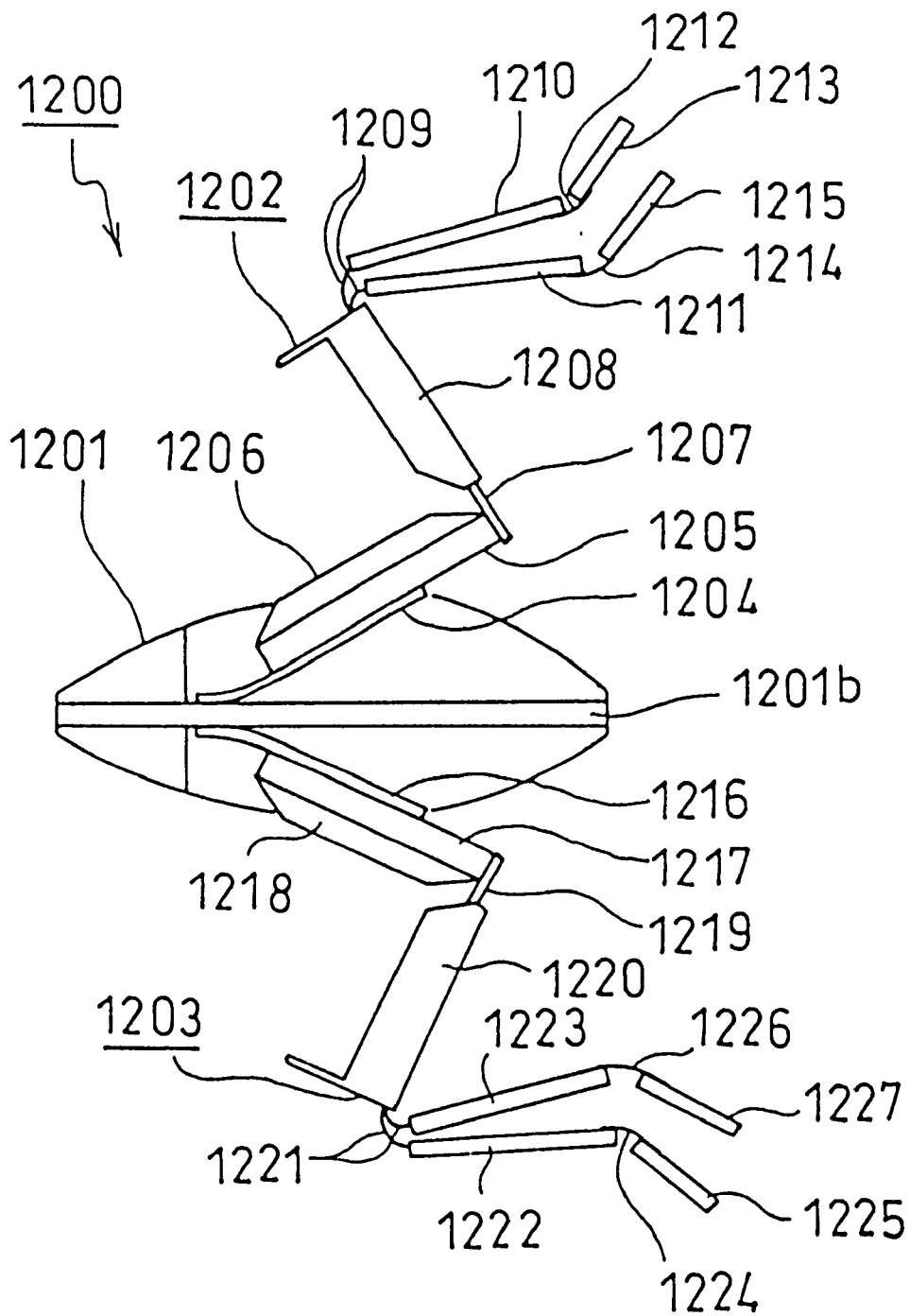
FIG. 27 is a bottom view showing a lure according to a thirteenth embodiment of the invention.
Figure 28:
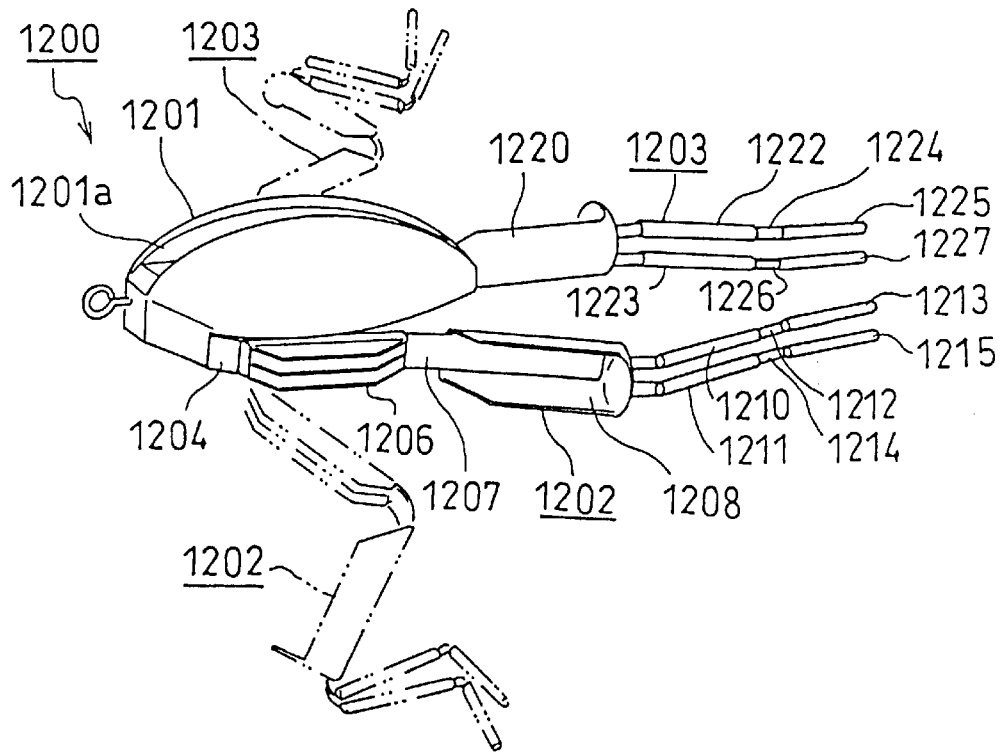
FIG. 28 is a perspective view showing motions of the lure according to the thirteenth embodiment.

This lure 1200 is constituted, as shown in FIG. 27 (bottom view of the lure 1200), of a wooden body 1201, a first leg 1202, a second leg 1203. The body 1201 has symmetric right and left shapes as shown in FIG. 27. A groove 1201a for communicating water when the lure 1200 proceeds is formed as shown in FIG. 28 on an upper surface of the body 1201 as to extend in the proceeding direction of the lure 1200, and a leg support 1201b extending in the proceeding direction of the lure 1200 is formed on the bottom of the body 1201 (see, FIG. 27). A first elastic portion 1204 made of a rectangular rubber plate constituting the first leg 1202 is attached to one side of the leg support 1201*b*. The first elastic portion 1204 is attached as to curve outward, and one rectangular wood plate 1205 is attached on an outer side of the first elastic portion 1204. One resin molded water passing portion 1206 is attached on an outer side of the wood plate 1205. Three partition plates (reference numbers are omitted) are formed as shown in FIG. 28 on the surface of the one water passing portion 1206. A second elastic portion 1207 made of a rectangular rubber plate is attached to the distal end of the one wood piece 1205 as to extend perpendicular to the longitudinal direction of the one wood piece 1205, and one water receiving portion 1208, having the same shape as the one and the other water receiving portions 11, 12 constituting the lure 1 according to the first embodiment, is attached to the second elastic portion 1207. Stick type wooden strips 1210, 1211 are flexibly attached by a cloth connecting portion 1209 to the distal end of the one water receiving portion 1208. A stick type wooden strip 1213 is flexibly attached to the distal end of the wooden strip 1210 by a cloth connecting portion 1212, and a stick type wooden strip 1215 is flexibly attached to the distal end of the wooden strip 1211 by a cloth connecting portion 1214. A third elastic portion 1216 made of a rectangular rubber plate constituting the second leg 1203 is attached to the other side of the leg support 1201*b*. The third elastic portion 1216 is attached as to curve outward, and the other rectangular wood plate 1217 is attached on an outer side of the third elastic portion 1216. The other resin molded water passing portion 1218 is attached on an outer side of the other wood piece 1217. Three partition plates (reference numbers are omitted) are formed as shown in FIG. 28 on the surface of the other water passing portion 1218. A fourth elastic portion 1219 made of a rectangular rubber plate is attached to the distal end of the other wood piece 1217 as to extend perpendicular to the longitudinal direction of the other wood piece 1217, and the other water receiving portion 1220, having the same shape as the one and the other water receiving portions 11, 12 constituting the lure 1 according to the second embodiment, is attached to the fourth elastic portion 1219. Stick type wooden strips 1222, 1223 are flexibly attached by a cloth connecting portion 1225 to the distal end of the other water receiving portion 1220. A stick type wooden strip 1225 is flexibly attached to the distal end of the wooden strip 1222 by a cloth connecting portion 1224, and a stick type wooden strip 1227 is flexibly attached to the distal end of the wooden strip 1223 by a cloth connecting portion 1226. When the lure 1200 is manipulated in the lure proceeding direction, the first and second legs 1202, 1203 extend as indicate by a solid line in FIG. 28 in parallel to the proceeding direction of the lure 1200. When the lure 1200 stops proceeding, the first and the second legs 1202, 1203 come back to the original position indicated by a two-dot chain line shown in FIG. 28. The one and the other wooden pieces 1205, 1217 at that time move in a direction to be apart from the leg support 1201*b* in opposing to elastic force of the first and third elastic portions 1204, 1216, and by the elastic force of the first and third elastic portions 1204, 1216, come back again to the original position.

A lure 1300 according to a fourteenth embodiment is described next.

Figure 29:
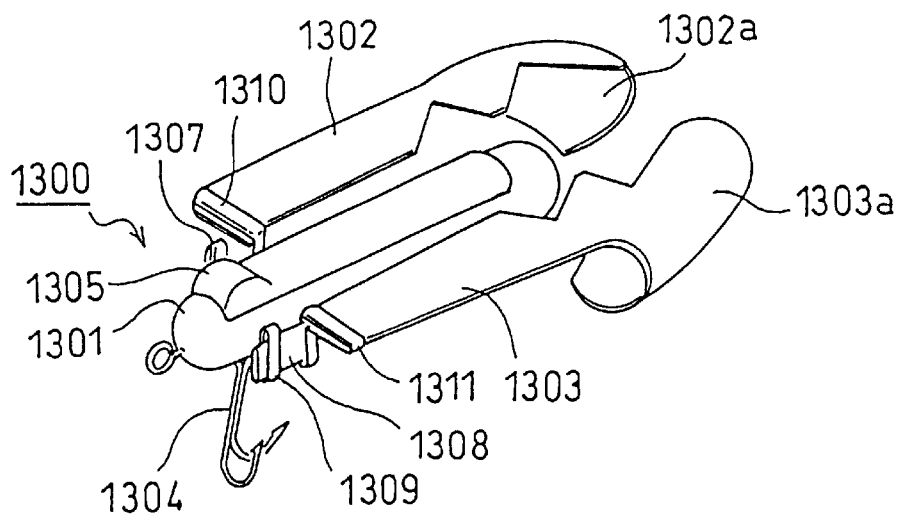
FIG. 29 is a perspective view showing a lure according to a fourteenth embodiment of the invention.
Figure 30:
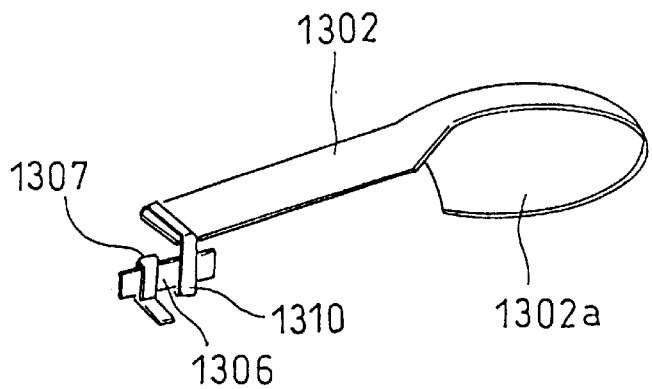
FIG. 30 is a perspective view showing a wing plate of the lure according to the fourteenth embodiment.
Figure 31:
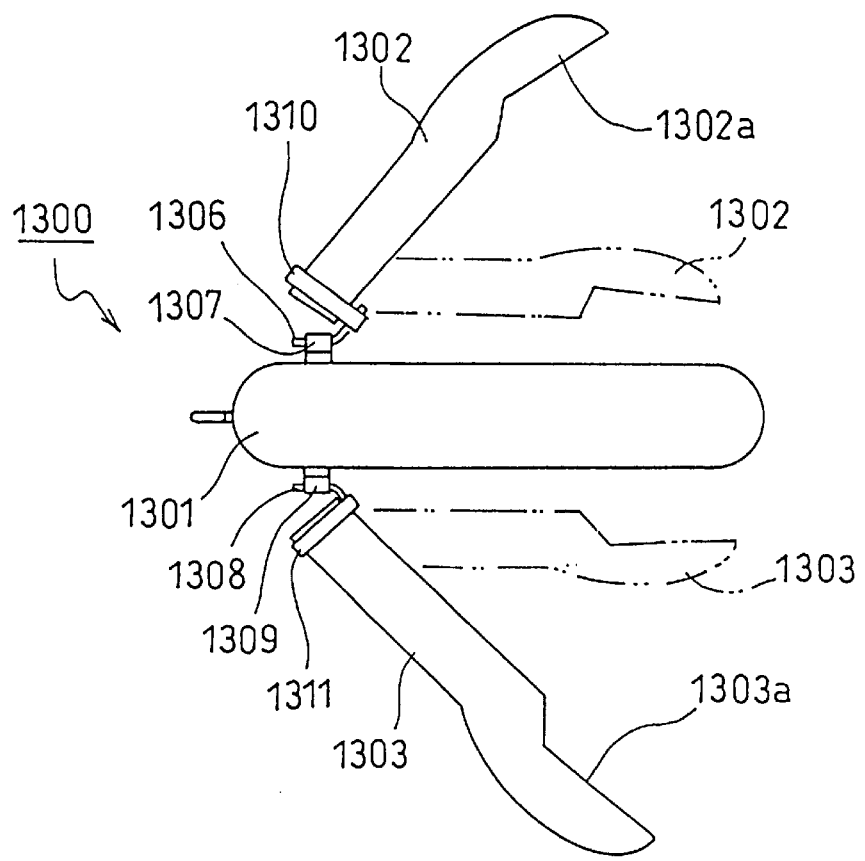
FIG. 31 is a plan view showing motions of the lure according to the fourteenth embodiment.

A lure 1300 is constituted as shown in FIG. 29 of a wooded made body 1301, a first wing plate 1302, a second wing plate 1303, and a hook 1304. A floating adjustment member 1305 molded from a caulk to adjust the floating force of the lure 1300 is attached to an upper surface of the body 1301. One elastic portion 1306 made of a rectangular rubber plate is attached as shown in FIG. 31 on one side of a middle front end of the body 1301 by one elastic support 1307 made of a metal whose proximal end is secured to the one side of the body 1301, and the other elastic portion 1308 made of a rectangular rubber plate is attached on the other side of a middle front end of the body 1301 by the other elastic support 1309 made of a metal whose proximal end is secured to the other side of the body 1301. The hook 1304 is attached at a middle bottom of the body 1302 by an anchor not shown (see, FIG. 29). The first wing plate 1302 resin-molded is attached at one end of the one elastic portion 1306 by one wing plate support 1310 molded of a metal. The second wing plate 1303 resin-molded is attached at one end of the other elastic portion 1308 by the other wing plate support 1311 molded of a metal. As shown in FIGS. 30, 31, the distal ends of the one and the other wing plates 1302, 1303 extended downward in a circle shape, thereby forming one and the other water receiving portions 1302*a*, 1303*a* having a cup shaped concave surface facing the proceeding direction of the lure 1300. When the lure 1300 is case to the water surface, the one and the other wing plates 1302, 1303 extend right and left as shown by a solid line in FIG. 31 by pressure of water exerted from a lower side to the one and the other water receiving portions 1302*a*, 1303*a*, and right after this, come back to the original position indicated by a two-dot chain line shown in FIG. 31 by elastic force of the one and the other elastic portions 1306, 1308. When the lure 1300 is manipulated in the lure proceeding direction, the one and the other wing plates 1302, 1303 extend right and left as indicate by a solid line in FIG. 31 by resistance of water entered in the one and the other water receiving portions 1302*a*, 1303*a*, and right after this, come back to the original position indicated by a two-dot chain line shown in FIG. 31 by elastic force of the one and the other elastic portions 1306, 1308. When the lure 1300 is manipulated quickly, bubbles are produced at the water surface when the one and the other wing plates 1302, 1303 extend right and left, and sounds are produced when the bubbles burst. These sounds effectively work to stimulate and attract underwater fish.

A lure 1400 according to a fifteenth embodiment is described next.

Figure 32:
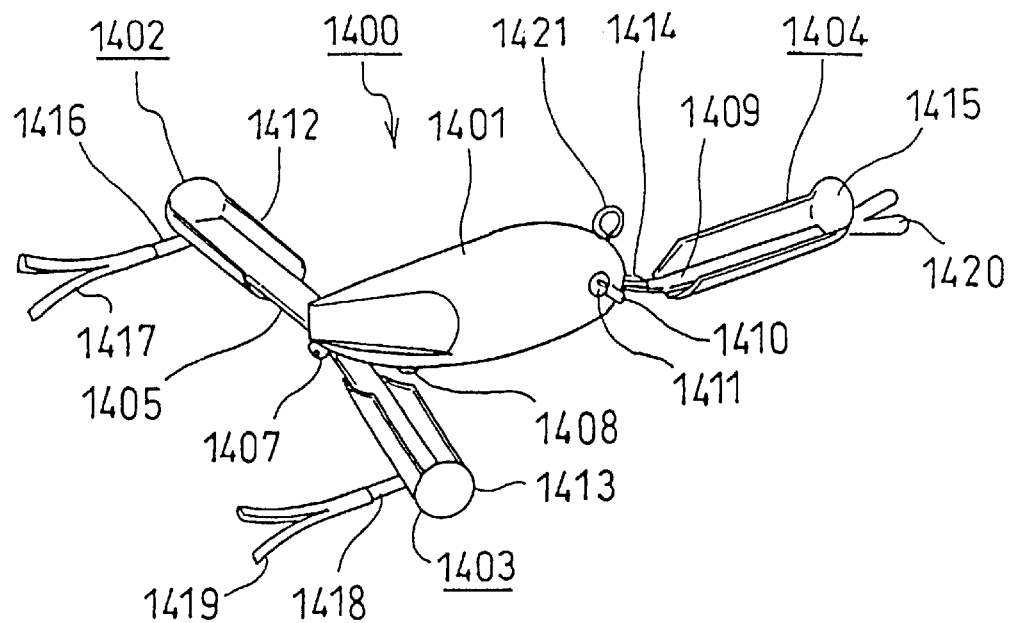
FIG. 32 is a perspective view showing a lure according to a fifteenth embodiment of the invention.
Figure 33:
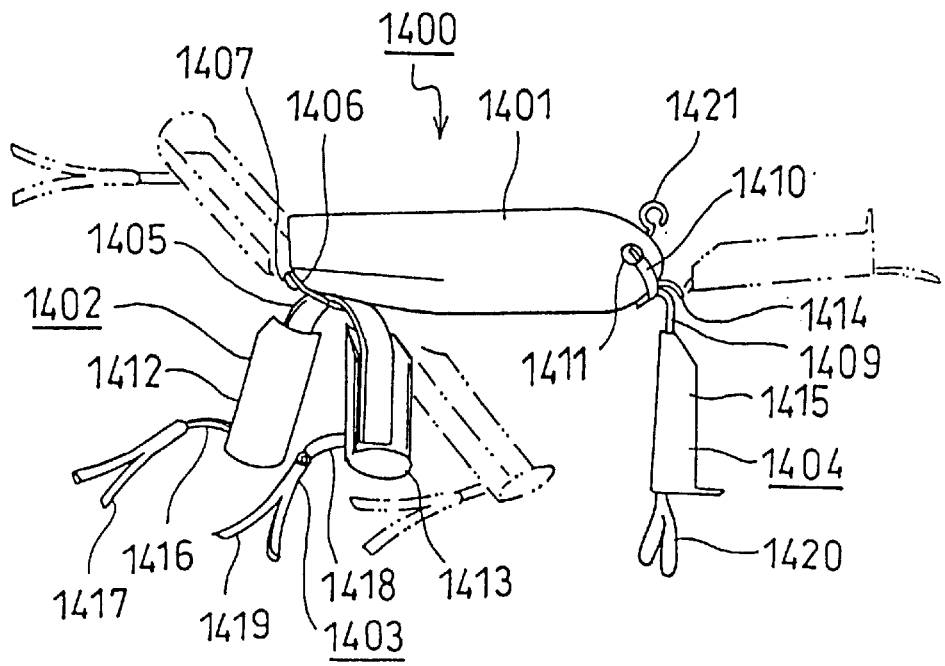
FIG. 33 is a perspective view showing motions of the lure according to the fifteenth embodiment.

The lure 1400 is constituted as shown in FIG. 32 of a wooded made body 1401, a first leg 1402, a second leg 1403, and a third leg 1404. A first elastic portion 1405 made of a rectangular rubber plate, constituting the first and second legs 1402, 1403 is fixed at a center of the elastic portion to a front lower end of the body 1401 by a metal fitting 1406 whose one end is fixed by a first screw 1407 as shown in FIG. 32 and whose other end is fixed by a second screw 1408. A second elastic portion 1409 made of a rectangular rubber plate, constituting the third leg 1404 is fixed as shown in FIG. 33 on a proximal end of the elastic portion to a rear end of the body 1401 by a metal fitting 1410 whose one end is fixed by a third screw 1411 as shown in FIG. 32 and whose other end is fixed by a fourth screw not shown. A first water receiving portion 1412 having a water receiving face directing upward is attached to one end of the first elastic body 1405, and a second water receiving portion 1413 having a water receiving face directing upward is attached to the other end of the first elastic body 1405. The second elastic portion 1409 is inclined downward from the proximal end side to the distal end side by an L-shaped pushing plate 1414 attached to the upper proximal end of the second elastic portion 1409. A third water receiving portion 1415 on which a water receiving face directing upward is formed is attached on the bottom of the second elastic portion 1409. The first to third water receiving portions 1412, 1413, 1415 have the same shape as the one and the other water receiving portions constituting the lure 1 according to the first embodiment. One resin piece 1417 in a Y-shape molded of a resin is flexibly attached to the distal end of the first water receiving portion 1412 by a cloth connecting portion 1416. The other resin piece 1419 in a Y-shape molded of a resin is flexibly attached to the distal end of the second water receiving portion 1413 by a cloth connecting portion 1418. A cloth tail 1420 is attached to a distal end of the third water receiving portion 1415. An anchor 1421 whose tip is in a ring shape for connecting a fishing line not shown is attached to a middle portion on a rear end side on an upper surface of the body 1401. The lure 1400 is designed to have specific gravity heavier than water and if cast to the water surface, may sink gradually to the bottom of, e.g., a lake. When the lure 1400 is manipulated in the lure proceeding direction, the first and second elastic portions 1405, 1409 are bent downward as shown by a solid line in FIG. 33 by resistance of water entered in the first to third water receiving portions 1412, 1413, 1415. When the lure 1400 stops proceeding, the portions come back to a position indicated by a two-dot chain line in FIG. 33 by elastic force of the first and second elastic portions 1405, 1409. When this manipulation of the lure 1400 is repeated, the first and second elastic portions 1405, 1409 repeat bending and bending back to stimulate underwater fish while the lure move with motions closely imitating a shrimp as a bait for fish.

Figure 34:
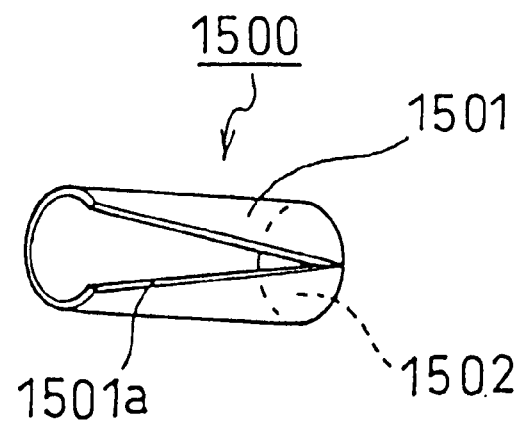
FIG. 34 is a perspective view showing a different configuration of a water receiving portion of the lure according to the invention.
Figure 35:
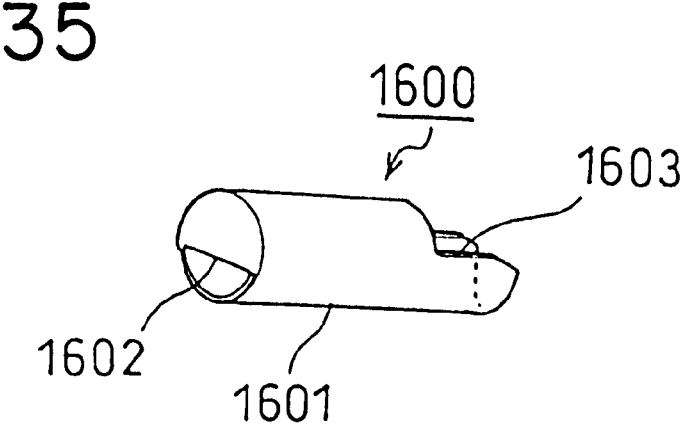
FIG. 35 is a perspective views showing a different configuration of a water receiving portion of the lure according to the invention.

The shape of the water receiving portion attached to the elastic portion in this invention can be formed as a water receiving portion 1500, as shown in FIG. 34, which is constituted of a hollow pipe 1501 in which water enters, a circled contact portion 1502 formed by closing one end of the pipe 1501 to which water entered in the pipe 1501 contacts, a V-shaped cutaway 1501a formed at the other end of the pipe 1501, or as a water receiving portion 1600 as shown in FIG. 35, which is constituted of a hollow pipe 1601 in which water enters, a hemisphere contact portion 1602 formed by closing one end of the pipe 1601 to which water entered in the pipe 1601 contacts, and a concave face portion in which one end of the pipe 1601 is formed in a conduit shape. The lure may have a plurality of water receiving portions (not shown) having a concave face in a cup shape directing the proceeding direction on a proceeding direction side of the elastic portions.

As apparent from above descriptions for above embodiments, the lure according to the invention includes: a body molded from a material having a lower specific gravity than water; and a leg portion formed on right and left sides of the body at a middle or rear portion of the body. Where connected to a fishing line attached to a rod and cast at the water surface of rivers, lakes, and seas in which fish are conceivably hiding, this lure is moved at the water surface by manipulating the rod with or without a reel by hands. Since the leg portion has an elastic portion extending outwardly from the body as a center to right and left opposing ends of the elastic portion and a pair of water receiving portions secured to the right and left ends of the elastic portions, respectively, each having a water receiving face extending perpendicular to a lure proceeding direction, when the body moves in the proceeding direction by manipulation of the rod, water resistance entered in the pair of the water receiving portions makes the pair of the water receiving portions located inline with the body. When the body ceases to proceed, the pair of the water receiving portions comes back to the original position by elastic force of the elastic portions. Since the lure, by repeating such manipulations of the rod, moves at the water surface in repeating bending and bending back of the elastic portions, the lure performs imitated motions very close to those of small creatures such as frogs as baits for fish, thereby stimulating fish as well as their appetite, and thereby remarkably increasing an amount of fish caught in comparison with use of conventional lures.

Where each of the water receiving portions has contact portions to which water entered in the water receiving portions contact when the body is manipulated to move in the lure proceeding direction, water resistance entered in the one and the other water receiving portions becomes larger, and therefore, the elastic portion moves with larger actions of bending and bending back. Consequently, bending and bending back motions of the elastic portions further come closer to those of small creatures.

With a lure having an elastic portion unitedly formed of a rectangular rubber plate, such an elastic portion makes itself inexpensive and makes production easier, such as easier attachments of the water receiving portions or the like.

With a body having one or more grooves extending parallel to the lure proceeding direction, such a groove or grooves allow water to flow through the groove or grooves, thereby stabilizing the position of the lure without swinging when the body proceeds at the water surface, further making motions closer to those of small creatures.

In another lure, leg supports are formed on right and left sides of the body molded from a material having a lower specific gravity than water, and one and the other wing plates are secured to one and the other leg pivotably supported to the leg supports. When the lure proceeds, the one and the other legs move pivotally by elastic force of the elastic portions constituting the one and the other legs and resistance of water entered in the water receiving portions, and the one and the other wing plates secured to the one and the other legs hit the water surface, thereby generating sounds and vibrations, rendering the lure perform motions very resemble to those of small creature such as, e.g., insects as a bait for fish.

In yet another a lure, a first elastic portion is formed at a front end of the body molded from a material having a lower specific gravity than water; a second elastic portion is formed at a rear end of the body; first and second water receiving portions having water receiving faces directing upward are secured to one and the other ends of the first elastic portion; and a third water receiving portion having a water receiving face directing upward is secured to the second elastic portion. When this lure is manipulated, water resistance entered in the first to third water receiving portions makes the first and second elastic portions bend downward, and when the lure ceases to move, the elastic portions come back to the original position by elastic force of the first and second elastic portions. When such manipulations of the lure are repeated, the first and second elastic portions repeat bending and bending back, thereby rendering the lure move with imitated motions, e.g., like a shrimp as a bait for fish, thereby stimulating underwater fish. Accordingly, with this lure, as well as the above lures, the angler can have a great amount of fish catches.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but defined claims set forth below.

What is claimed is:

1. A lure comprising:

a body molded from a material having a lower specific gravity than water and having a front portion; and a pair of legs formed to extend on right and left sides of the body at one of a middle or rear portion of the body, the pair having an elastic portion extending outwardly from the body which comprises a center portion, a right end and a left end, and a pair of water receiving portions secured to the right and left ends of the elastic portion, respectively, each having a water receiving face extending outwardly from the body, wherein the elastic portion is integrally formed of a rectangular rubber plate having a rectangular cross-section with a flat front surface, a rear surface and side surfaces, the flat front surface being attached to face toward the front portion of the body, and the water receiving portions each have a tubular shaped cross-section with a portion removed leaving a longitudinally extending opening, the longitudinally extending opening facing toward the front portion of the body.

2. The lure according to claim 1, wherein each of the water receiving portions has, at a distal end of each of the water receiving portions, a contact portion to which water entered in the water receiving portion contacts when the body is manipulated to move forwardly.

3. The lure according to claim 1, wherein the body has one or more grooves extending parallel to a longitudinal axis of the body.

* * * * *